United States Patent
Li et al.

(10) Patent No.: US 12,437,811 B2
(45) Date of Patent: Oct. 7, 2025

(54) ERASE ALGORITHM WITH A WEAK PROGRAM PULSE FOR NON-VOLATILE MEMORY

(71) Applicant: Crossbar, Inc., Santa Clara, CA (US)

(72) Inventors: Zhi Li, Santa Clara, CA (US); Sung Hyun Jo, Sunnyvale, CA (US); Jordan Frick, San Jose, CA (US)

(73) Assignee: Crossbar, Inc., Santa Clara, CA (US)

( * ) Notice: Subject to any disclaimer, the term of this patent is extended or adjusted under 35 U.S.C. 154(b) by 197 days.

(21) Appl. No.: 18/119,104

(22) Filed: Mar. 8, 2023

(65) Prior Publication Data
US 2024/0304243 A1   Sep. 12, 2024

(51) Int. Cl.
G11C 13/00 (2006.01)

(52) U.S. Cl.
CPC ...... *G11C 13/0097* (2013.01); *G11C 13/0033* (2013.01); *G11C 13/004* (2013.01); *G11C 13/0064* (2013.01); *G11C 13/0069* (2013.01)

(58) Field of Classification Search
CPC ............ G11C 13/0097; G11C 13/0033; G11C 13/004; G11C 13/0064; G11C 13/0069; G11C 2013/0073; G11C 13/0007
See application file for complete search history.

(56) References Cited

U.S. PATENT DOCUMENTS

| | | | | |
|---|---|---|---|---|
| 9,001,553 B1 * | 4/2015 | Kamalanathan | ... | G11C 13/0069 365/158 |
| 9,053,786 B2 | 6/2015 | Ichihara et al. | | |
| 9,524,777 B1 * | 12/2016 | Kamalanathan | ... | G11C 13/0069 |
| 10,373,697 B1 * | 8/2019 | Lai | ...... | G11C 11/5635 |
| 10,998,064 B2 * | 5/2021 | Guy | ...... | G11C 13/0069 |
| 11,790,999 B2 * | 10/2023 | Guy | ...... | G11C 13/0069 365/185.29 |
| 2008/0137436 A1 * | 6/2008 | Salter | ............. | G11C 16/3418 365/201 |
| 2009/0010039 A1 | 1/2009 | Tokiwa et al. | | |
| 2012/0188813 A1 | 7/2012 | Chien et al. | | |
| 2017/0092368 A1 * | 3/2017 | Suito | ................ | G11C 16/345 |

(Continued)

FOREIGN PATENT DOCUMENTS

| KR | 10-2010-0106238 | 10/2010 |
|---|---|---|
| KR | 10-2013-0119493 | 10/2013 |

(Continued)

OTHER PUBLICATIONS

Office action for Taiwan Patent Application No. 113108695, dated Jun. 13, 2025, 28 pages long.

*Primary Examiner* — Amir Zarabian
*Assistant Examiner* — Justin Bryce Heisterkamp
(74) *Attorney, Agent, or Firm* — Wegman Hessler Valore

(57) ABSTRACT

Improved erase techniques and apparatuses can improve performance and longevity of non-volatile memory. Various disclosed techniques include performing an erase operation(s) on a group of such memory cells, followed by a weak program operation. One or more subsequent erase-verify operations can be implemented until no erase disturb states are detected for the memory cells, or until a maximum erase-verify cycle count is reached. In one or more embodiments, additional weak program and erase-verify cycles can be implemented to enhance cycle longevity and reduce erase disturb states for the group of non-volatile memory.

20 Claims, 13 Drawing Sheets

(56) References Cited

U.S. PATENT DOCUMENTS

| | | | |
|---|---|---|---|
| 2019/0252029 A1* | 8/2019 | Lai | G11C 16/16 |
| 2019/0272882 A1* | 9/2019 | Guy | G11C 11/5678 |
| 2021/0312995 A1* | 10/2021 | Guy | G11C 16/26 |

FOREIGN PATENT DOCUMENTS

| | | |
|---|---|---|
| TW | 201232543 | 8/2012 |
| TW | 201539707 | 10/2015 |

\* cited by examiner

EXAMPLE ERASE PROCESS WITH WEAK PROGRAM
200

| PULSE # 202 | TYPE 204 | TOTAL ERROR 206 | PRGM. ERROR 208 | ERASE ERROR 210 |
|---|---|---|---|---|
| N/A | Program | 0 | 0 | 0 |
| 1 | Erase | 1 | 0 | 1 |
| 2 | Erase | 0 | 0 | 0 |
| 1 | Weak Prog | 1017 | 0 | 1017 |
| 3 | Erase | 0 | 0 | 0 |
| 2 | Weak Prog | 580 | 0 | 580 |
| 4 | Erase | 1 | 0 | 1 |
| 5 | Erase | 0 | 0 | 0 |
| 3 | Weak Prog | 442 | 0 | 442 |
| 6 | Erase | 1 | 0 | 1 |
| 7 | Erase | 0 | 0 | 0 |
| 4 | Weak Prog | 348 | 0 | 348 |
| 8 | Erase | 0 | 0 | 0 |
| N/A | Final Read | 0 | 0 | 0 |

FIG. 2

EXAMPLE CELL STATUS FOR ERASE PROCESS
300

| PULSE ID 302 | | CELL 1 312 | CELL 2 314 | CELL 3 316 | CELL 4 318 |
|---|---|---|---|---|---|
| | Program | P | P | P | P |
| 322 | Erase 1 | E&V | E&V | E&V | E&V |
| | | E | E | E | P |
| | Erase 2 | E&V | E&V | E&V | E&V |
| | | E | E | E | E |
| 324 | Weak Prog 1 | WP&V | WP&V | WP&V | WP&V |
| | | E | P | P | P |
| 322 | Erase 3 | E&V | E&V | E&V | E&V |
| | | E | E | E | E |
| 324 | Weak Prog 2 | WP&V | WP&V | WP&V | WP&V |
| | | P | E | E | P |
| 322 | Erase 4 | E&V | E&V | E&V | E&V |
| | | E | E | E | P |
| | Erase 5 | E&V | E&V | E&V | E&V |
| | | E | E | E | E |
| 324 | Weak Prog 3 | WP&V | WP&V | WP&V | WP&V |
| | | E | E | E | P |
| 322 | Erase 6 | E&V | E&V | E&V | E&V |
| | | E | E | E | P |
| | Erase 7 | E&V | E&V | E&V | E&V |
| | | E | E | E | E |
| 324 | Weak Prog 4 | WP&V | WP&V | WP&V | WP&V |
| | | E | E | E | P |
| 322 | Erase 8 | E&V | E&V | E&V | E&V |
| | | E | E | E | E |
| | Final Read | | | | |

FIG. 3

ERASE ALGORITHM WITH A WEAK PROGRAM PULSE FOR NON-VOLATILE MEMORY

INCORPORATION BY REFERENCE

U.S. patent application Ser. No. 16/291,467 filed Mar. 4, 2019, and titled RESISTIVE RANDOM ACCESS MEMORY PROGRAM AND ERASE TECHNIQUES AND APPARATUS, is hereby incorporated by reference herein in its entirety and for all purposes.

TECHNICAL FIELD

The subject disclosure relates generally to operations for controlling non-volatile memory, and as one illustrative example, an enhanced erase algorithm for a non-volatile memory.

BACKGROUND

Resistive-switching memory represents a recent innovation within the field of integrated circuit technology. While much of resistive-switching memory technology is in the development stage, various technological concepts for resistive-switching memory have been demonstrated and are in one or more stages of verification to prove or disprove associated theories or techniques. The inventors believe that resistive-switching memory technology shows compelling evidence to hold substantial advantages over competing technologies in the semiconductor electronics industry.

Resistive-switching memory cells can be configured to have multiple states with measurably distinct resistance values. For instance, for a single bit cell, the restive-switching memory cell can be configured to exist in a relatively low resistance state or, alternatively, in a relatively high resistance state. Multi-bit cells might have additional states with respective resistances that are distinct from one another and distinct from the relatively low resistance state and the relatively high resistance state. The distinct resistance states of the resistive-switching memory cell can be correlated with logical information states, facilitating digital memory operations. Accordingly, arrays of many such memory cells can provide many bits of digital memory storage.

Resistive-switching memory can be induced to enter one or another resistive state in response to an external condition. Thus, in transistor parlance, applying or removing the external condition can serve to program or de-program (e.g., erase) the memory. Moreover, depending on physical makeup and electrical arrangement, a resistive-switching memory cell can generally maintain a programmed or de-programmed state. Maintaining a state might require other conditions be met (e.g., existence of a minimum operating voltage, existence of a minimum operating temperature, and so forth), or no conditions be met, depending on the characteristics of a memory cell device.

The inventors have put forth several proposals for practical utilization of resistive-switching technology to memory applications for electronic devices. For instance, resistive-switching elements are often theorized as viable alternatives, at least in part, to metal-oxide semiconductor (MOS) type memory transistors employed for electronic storage of digital information. Models of resistive-switching memory devices provide some potential technical advantages over non-volatile FLASH MOS type transistors.

In light of the above, continued development of practical utilizations of resistive-switching technology are pursued by the Assignee of the present disclosure.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

The present disclosure provides for improved erase techniques and apparatuses for improving performance and longevity of non-volatile memory. The various techniques include performing an erase operation(s) on a group of such memory cells, followed by a weak program operation. One or more subsequent erase-verify operations are implemented until no erase disturb states are detected for the memory cells, or until a maximum erase-verify cycle count is reached. In one or more embodiments, additional weak program and erase-verify cycles can be implemented to enhance cycle longevity and reduce erase disturb states for the group of non-volatile memory.

In an embodiment, disclosed is a method for reducing bit disturb associated with erasing memory cells of a non-volatile two-terminal resistive switching memory device. The method can comprise implementing a program process on a plurality of non-volatile memory cells of an array of non-volatile two-terminal resistive switching memory devices, the plurality comprising a first non-volatile memory cell and a second non-volatile memory cell and performing a first erase-verify process on the first and second non-volatile memory cells. The first erase-verify process can further comprise applying an erase process to the first and second non-volatile memory cells, and reading the first and second non-volatile memory cells to determine whether both memory cells are in an erase state. Further, the method can comprise in response to determining both memory cells are in the erase state, performing a first weak program process on the first and second non-volatile memory cells. In various embodiments, the weak program process can comprise at least one of: a lower pulse count than the program process, a lower voltage magnitude than the program process or a lower pulse duration than the program process. Further, the method can comprise performing a second erase-verify process on the first and second non-volatile memory cell. The second erase-verify process can comprise applying the erase process to the first and second non-volatile memory cells and reading the first and second non-volatile memory cells to determine whether both memory cells are in the erase state. Still further, the method can comprise performing a final read process to determine both the first and second non-volatile memory cells are in the erase state.

In another embodiment, disclosed is a method of erasing a non-volatile memory device. The method can comprise erasing each of a plurality of non-volatile memory cells of a memory device that are in a program state and detecting whether any of the plurality of non-volatile memory cells is associated with an erase disturb state following the erasing. In addition, the method can comprise weakly programming each of the plurality of non-volatile memory cells with a polarity opposite that of the erasing in response to detecting no erase disturb state and further erasing each of the plurality of non-volatile memory cells. Further, the method can comprise detecting whether any of the non-volatile memory cells is associated with the erase disturb state in response to the further erasing and reading erase states of the plurality of non-volatile memory cells in response to detecting no erase disturb states associated with any of the non-volatile memory cells.

In addition to the foregoing, the present disclosure provides a method. The method can comprise programming non-volatile memory cells of a non-volatile memory device to a program state, erasing the non-volatile memory cells and detecting whether any of the non-volatile memory cells have an erase disturb state. The method can also comprise optionally re-erasing the non-volatile memory cells in response to detecting an erase disturb state for one of the non-volatile memory cells. Still further, the method can comprise weakly programming the non-volatile memory cells at a voltage, pulse duration or pulse count less than that of the programming, further erasing the non-volatile memory cells in response to the weakly programming and receiving temperature data indicative of an operating temperature of the non-volatile memory device in comparison with a temperature threshold value or range of threshold values. In one or more embodiments, the method can comprise one of the following: in response to the operating temperature being below the temperature threshold value or range of threshold values, detecting an erase disturb state associated with a portion of the non-volatile memory cells in response to the further erasing and further re-erasing only the portion of the non-volatile memory cells, or in response to the operating temperature being at or above the temperature threshold value or range of threshold values, detecting the erase disturb state associated with the portion of the non-volatile memory cells and further re-erasing all of the non-volatile memory cells. Still further, the method can comprise reading a final erase state of the non-volatile memory cells.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of the subject disclosure may be practiced without these specific details, or with other methods, components, materials, etc. In other instances, well-known structures and devices are shown in block diagram form to facilitate describing the subject disclosure.

FIG. 2 depicts a table of an example erase process utilizing weak program and illustrative erase disturb response for a set of non-volatile memory cells, in an embodiment(s);

FIG. 3 illustrates an example cell state response for the example erase process of FIG. 2 according to additional embodiments;

DETAILED DESCRIPTION

Introduction

Figure 1:
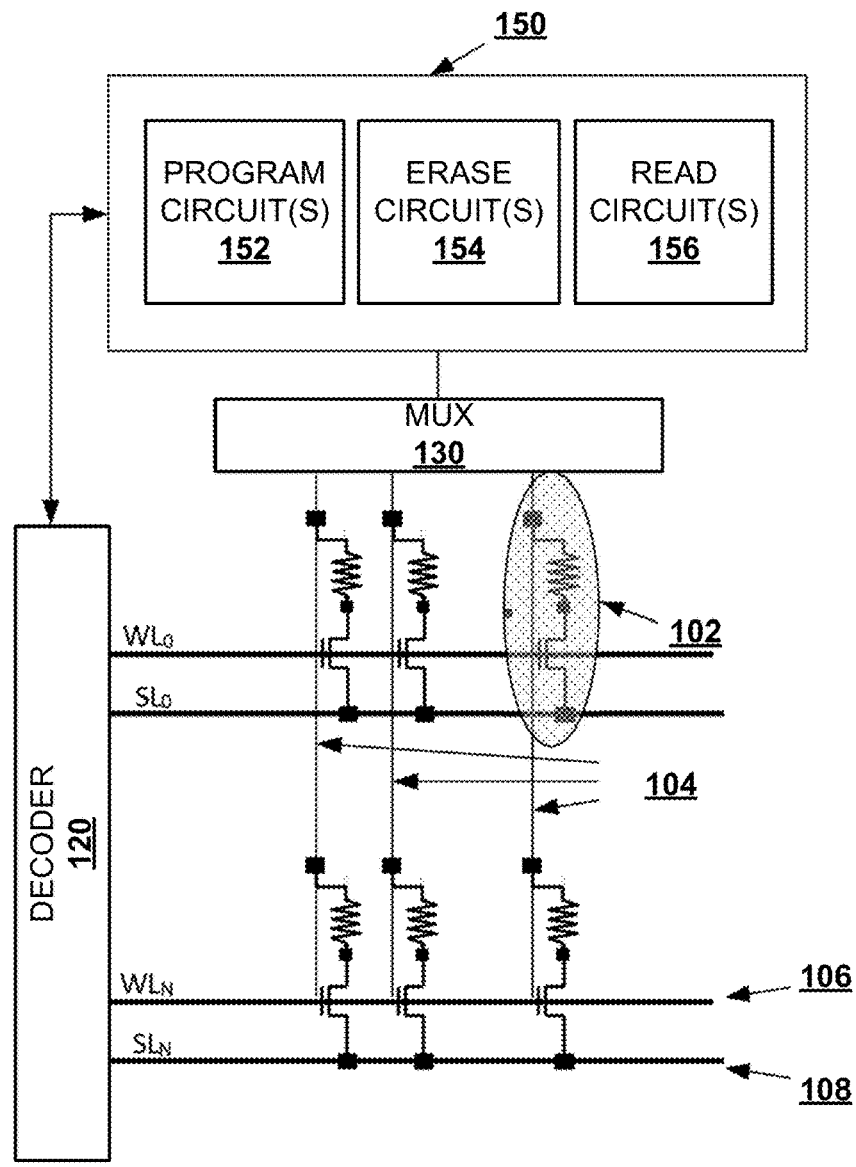
FIG. 1 depicts a schematic diagram of an example two-terminal resistive switching memory array and operation circuitry according to disclosed embodiments.

Aspects of the present disclosure provide for an improved erase process for non-volatile memory. For instance, in one or more embodiments an improved erase process can utilize one or more weak program pulses in conjunction with erasing a two-terminal, non-volatile resistive switching memory device. In some embodiments, a number of weak program pulses employed for an erase process can be in part determined on a target erase disturb—or erase failure—count. In other embodiments, the number of weak program pulses can depend in part on an operating temperature of a memory device. In still further embodiments, the operating temperature can in part determine a portion of memory cells on which weak program or cyclic erase can be implemented.

As utilized herein, the term "substantially" and other relative terms or terms of degree (e.g., about, approximately, substantially, and so forth) are intended to have the meaning specified explicitly in conjunction with their use herein, or a meaning which can be reasonably inferred by one of ordinary skill in the art, or a reasonable variation of a specified quality(ies) or quantity(ies) that would be understood by one of ordinary skill in the art by reference to this entire specification (including the knowledge of one of ordinary skill in the art as well as material incorporated by reference herein). As an example, a term of degree could refer to reasonable manufacturing tolerances about which a specified quality or quantity could be realized with fabrication equipment. Thus, as a specific illustration, though non-limiting, for an element of an integrated circuit device expressly identified as having a dimension of about 50 angstroms (Å), the relative term "about" can mean reasonable variances about 50 Å that one of ordinary skill in the art would anticipate the specified dimension of the element could be realized with commercial fabrication equipment, industrial fabrication equipment, laboratory fabrication equipment, or the like, and is not limited to a mathematically precise quantity (or quality). In other examples, a term of degree could mean a variance of +/−0-3%, +/−0-5%, or +/−0-10% of an expressly stated value, where suitable to one of ordinary skill in the art to achieve a stated function or feature of an element disclosed herein. In still other examples, a term of degree could mean any suitable variance in quality(ies) or quantity(ies) that would be suitable to accomplish an explicitly disclosed function(s) or feature(s) of a disclosed element. Accordingly, the subject specification is by no means limited only to specific qualities and quantities disclosed herein, but includes all variations of a specified quality(ies) or quantity(ies) reasonably conveyed to one of ordinary skill in the art by way of the context disclosed herein.

As the name implies, a two-terminal memory device has two terminals or electrodes. Herein, the terms "electrode" and "terminal" are used interchangeably. Generally, a first electrode of a two-terminal resistive switching device is referred to as a "top electrode" (TE) and a second electrode of the two-terminal resistive switching device is referred to as a "bottom electrode" (BE), although it is understood that electrodes of two-terminal resistive switching devices can be according to any suitable arrangement, including a horizontal arrangement in which components of a memory cell are (substantially) side-by-side rather than overlying one another. Situated between the TE and BE of a two-terminal memory device is typically an interface layer sometimes referred to as a switching layer, a resistive switching medium (RSM) or a resistive switching layer (RSL). When incorporating a RSM, the two-terminal memory device can be referred to as a (two-terminal) resistive switching device.

Composition of memory cells, generally speaking, can vary per device with different components, materials or deposition processes selected to achieve desired characteristics (e.g., stoichiometry/non-stoichiometry, volatility/non-volatility, on/off current ratio, switching time, read time, memory durability, program/erase cycle, and so on). One example of a conductive bridge random access memory (RAM) or programmable metallization cell device can comprise: a relatively (electrochemically) inert conductive layer, e.g., metal, metal-alloy, metal-nitride, etc. (e.g., comprising W, Ni, Pt, $Ti_xN_y$ (where x and y are respective suitable positive numbers), Ir, or other suitable metal compounds) and an electrochemically active conductive layer, e.g., metal, metal-alloy, metal-nitride, etc. (e.g., comprising $Al_xN_y$ (e.g., non-stoichiometric and conducting), Ag, Cu, or other suitable metal compounds), separated by a resistive switching layer (RSL) (e.g., comprising $Al_xO_y$, $Si_xO_y$, $Ti_xO_y$, or other suitable oxide). Under suitable conditions, the active metal-containing layer can provide filament-forming ions (e.g., Al, Ag, Cu, etc.) to the RSL. In such embodiments, a conductive filament (e.g., formed by the ions) can facilitate electrical conductivity through at least a subset of the RSL, and a resistance of the filament-based device can be determined, as one example, by a tunneling resistance between the filament and the conductive layer. A memory cell having such characteristics may be described as a programmable metallization cell, conductive bridge RAM, or a filamentary-based device.

A RSL (which can also be referred to in the art as a resistive switching media (RSM)) can comprise, e.g., an undoped amorphous Si-containing layer, a semiconductor layer having intrinsic characteristics, a stoichiometric or non-stoichiometric silicon nitride (e.g., SiN, $Si_3N_4$, $SiN_x$, etc.), a Si sub-oxide (e.g., $SiO_x$ wherein x has a value between 0.1 and 2), a Si sub-nitride, a metal oxide, a metal nitride, a non-stoichiometric silicon compound, and so forth. Other examples of materials suitable for the RSL could include $Si_xGe_yO_z$ (where x, y and z are respective suitable positive numbers), a silicon oxide (e.g., SiON, where N is a suitable positive number), a silicon oxynitride, an undoped amorphous Si (a-Si), amorphous SiGe (a-SiGe), $TaO_B$ (where B is a suitable positive number), $HfO_C$ (where C is a suitable positive number), $TiO_D$ (where D is a suitable number), $Al_2O_E$ (where E is a suitable positive number) and so forth, a nitride (e.g., AlN, SiN), or a suitable combination thereof.

In some embodiments, a RSL employed as part of a non-volatile memory device (non-volatile RSL) can include a relatively large number (e.g., compared to a volatile selector device) of material voids or defects to trap neutral metal particles (e.g., at low voltage) within the RSL. The large number of voids or defects can facilitate formation of a thick, stable structure of the neutral metal particles. In such a structure, these trapped particles can maintain the non-volatile memory device in a low resistance state in the absence of an external stimulus (e.g., electrical power), thereby achieving non-volatile operation.

An active metal-containing layer for a filamentary-based memory cell can include, among others: silver (Ag), gold (Au), titanium (Ti), titanium-nitride (TiN) or other suitable compounds of titanium, nickel (Ni), copper (Cu), aluminum (Al), chromium (Cr), tantalum (Ta), iron (Fe), manganese (Mn), tungsten (W), vanadium (V), cobalt (Co), platinum (Pt), hafnium (Hf), and palladium (Pd). Other suitable conductive materials, as well as stoichiometric or non-stoichiometric: compounds, nitrides, oxides, alloys, mixtures or combinations of the foregoing or similar materials can be employed for the active metal-containing layer in some aspects of the subject disclosure. Further, a non-stoichiometric compound, such as a non-stoichiometric metal oxide/metal-oxygen or metal nitride/metal nitrogen (e.g., $AlO_x$, $AlN_x$, $CuO_x$, $CuN_x$, $AgO_x$, $AgN_x$, and so forth, where x is a suitable positive number or range of numbers, such as: 0<x<2, 0<x<3, 0<x<4 or other number/range of numbers depending on metal compound, which can have differing values for differing ones of the non-stoichiometric compounds) or other suitable metal compound can be employed for the active metal-containing layer, in at least one embodiment.

In one or more embodiments, a disclosed filamentary resistive switching device can include an active metal layer comprising a metal-nitrogen selected from the group consisting of: $TiN_x$, $TaN_x$, $AlN_x$, $CuN_x$, $WN_x$ and $AgN_x$, where x is a positive number (or range of numbers) that can vary per metal-nitrogen material. In a further embodiment(s), the active metal layer can comprise a metal-oxygen selected from the group consisting of: $TiO_x$, $TaO_x$, $AlO_x$, $CuO_x$, $WO_x$ and $AgO_x$ where x is a positive number (or range of numbers) that can likewise vary per metal-oxygen material. In yet another embodiment(s), the active metal layer can comprise a metal oxygen-nitrogen selected from the group consisting of: $TiO_aN_b$, $AlO_aN_b$, $CuO_aN_b$, $WO_aN_b$ and $AgO_aN_b$, where a and b are suitable positive numbers/ranges of numbers. The disclosed filamentary resistive switching device can further comprise a switching layer comprising a switching material selected from the group consisting of: $SiO_y$, $AlN_y$, $TiO_y$, $TaO_y$, $AlO_y$, $CuO_y$, $TiN_x$, $TiN_y$, $TaN_x$, $TaN_y$, $SiO_x$, $SiN_y$, $AlN_x$, $CuN_x$, $CuN_y$, $AgN_x$, $AgN_y$, $TiO_x$, $TaO_x$, $AlO_x$, $CuO_x$, $AgO_x$, and $AgO_y$, where x and y are positive numbers (or ranges), and y is larger than x. Various combinations of the above are envisioned and contemplated within the scope of embodiments of the present invention.

In one example, a disclosed filamentary resistive switching device comprises a particle donor layer (e.g., the active metal-containing layer) comprising a stoichiometric or non-stoichiometric metal compound (or mixture) and a resistive switching layer. In one alternative embodiment of this example, the particle donor layer comprises a metal-nitrogen: $MN_x$, e.g., $AgN_x$, $TiN_x$, $AlN_x$, etc., and the resistive switching layer comprises a metal-nitrogen: $MN_y$, e.g., $AgO_y$, $TiO_y$, $AlO_y$, and so forth, where y and x are positive numbers (or ranges), and in some cases y is larger than x. In an alternative embodiment of this example, the particle donor layer comprises a metal-oxygen: $MO_x$, e.g., $AgO_x$, $TiO_x$, $AlO_x$, and so on, and the resistive switching layer comprises a metal-oxygen: $MO_y$, e.g., $AgO_y$, $TiO_y$, $AlO_y$, or the like, where y and x are positive numbers (or ranges), and in some cases y is larger than x. In yet another alternative, the metal compound of the particle donor layer is a $MN_x$ (e.g., $AgN_x$, $TiN_x$, $AlN_x$, etc.), and the resistive switching layer is selected from a group consisting of $MO_y$ (e.g., $AgO_y$, $TiO_y$, $AlO_y$, etc.) and $SiO_y$, where x and y are typically non-stoichiometric values, or vice versa in a still further embodiment.

As utilized herein, variables x, y, a, b, and so forth representative of values or ratios of one element with respect to another (or others) in a compound or mixture can have different values (or ranges) suitable for respective compounds/mixtures, and are not intended to denote a same or similar value or ratio among the compounds. Mixtures can refer to non-stoichiometric materials with free elements therein-such as metal-rich nitride or oxide (metal-oxide/nitride with free metal atoms), metal-poor nitride or oxide (metal-oxide/nitride with free oxygen/nitrogen atoms)—as well as other combinations of elements that do not form traditional stoichiometric compounds as understood in the art. Some details pertaining to embodiments of the subject disclosure can be found in the following U.S. patent applications that are licensed to the assignee of the present application for patent: application Ser. No. 11/875,541 filed Oct. 19, 2007 and application Ser. No. 12/575,921 filed Oct. 8, 2009; each of the foregoing patent applications are hereby incorporated by reference herein in their respective entireties and for all purposes in addition to those incorporated by reference elsewhere herein.

Some embodiments of the subject disclosure can employ a switching device that, in a first mode of operation (e.g., referred to herein as standard formation, multiple time programmable (MTP) operation, etc.), operates as a bipolar switching device that exhibits a first switching response (e.g., programming to one of a set of program states) to an electrical signal of a first polarity and a second switching response (e.g., erasing to an erase state) to the electrical signal having a second polarity. The bipolar switching device is contrasted, for instance, with a unipolar device that exhibits both the first switching response (e.g., programming) and the second switching response (e.g., erasing) in response to electrical signals having the same polarity and different magnitudes.

One resistive switching modality for a bipolar device involves a reversibly formable conductive filament. The reversibly formable conductive filament—also referred to as a filamentary-based switching device—can operate differently in response to different polarity external stimuli. As an example, a conductive path or a filament forms through a non-volatile RSL in response to a suitable program voltage applied across the memory cell. In particular, upon application of a programming voltage, metallic ions are generated from the active metal-containing layer and migrate into the non-volatile RSL layer. The metallic ions can occupy voids or defect sites within the non-volatile RSL layer. In some embodiments, upon removal of the bias voltage, the metallic ions become neutral metal particles and remain trapped in voids or defects of the non-volatile RSL layer. When sufficient particles become trapped, a filament is formed and the memory cell switches from a relatively high resistive state, to a relatively low resistive state.

Once a conductive filament is formed, trapped conductive particles embodying the conductive path or filament through the non-volatile RSL layer, and the resistance is typically determined by a tunneling resistance between one or more such particles and an electrical conductive material adjacent to the non-volatile RSL layer. In some resistive-switching devices, an erase process can be implemented to deform the conductive filament, at least in part, causing the memory cell to return to the high resistive state from the low resistive state. More specifically, upon application of an erase bias voltage, the metallic particles trapped in voids or defects of the non-volatile RSL become mobile ions and migrate back towards the active metal layer, or disassociate within the RSL (or a combination of the foregoing) to break electrical conductivity of the conductive filament through the RSL layer. This change of state, in the context of memory, can be associated with respective states of a binary bit.

In some disclosed embodiments, completion of a conductive filament (e.g., standard formation) can involve only a few particles (e.g., atoms, ions, conductive compounds, etc.) of conductive material, or less. As one particular example, an electrically continuous conductive filament could be established by position of 1-3 atoms at a boundary of a switching layer, whereas repositioning of one or more of these atoms can break that electrical continuity, in some embodiments. Because the scale can be so small between a completed filament and non-completed filament, an erased cell can become disturbed over time, reverting to a programmed or conductive state if atoms removed from the boundary drift into suitable position to reform electrical continuity of the conductive filament. This reversion from an erase state to a program state is called an erase disturb, or more generally a bit failure. Where an array of non-volatile memory cells has only a few erase disturb cells, the disturbed bits can be detected and corrected with memory bits allocated to error correction code (ECC) data and algorithms. When a number of erase disturb bits exceeds what can be corrected by ECC, data loss can result. Various embodiments of the present disclosure provide an improved erase process to significantly reduce erase disturb bits to mitigate or avoid data loss in non-volatile resistive switching memory devices.

Overview

For memory devices having switching characteristics based upon the presence or absence of a conductive filament(s) therein to change the resistance of the memory device between a low resistance state (filament present) and a high resistance state (filament disrupted), retention problems (short-term memory erase failures) can occur in some memory devices. Such failures include an erase disturb condition, which involves erasing a memory typically with a negative voltage, and after an amount of time, having the memory by itself return to a programmed state (e.g. from a high resistance state to a low resistance state).

Although a filament of a programmed memory cell may be immediately disrupted during an erase cycle, the physical movement of the conductive particles of the filament can be impermanent. More specifically, the disrupted conductive particles may relax and reform the conductive filament, an amount of time after the erase cycle. The amount of time may be short (corresponding to short-term memory problems) for some memory devices and long (corresponding to long-term memory endurance problems) for other memory devices on the same memory structure.

Embodiments disclosed herein present a modified erase process wherein after an initial erase cycle on one or more memory devices (typically with a negative voltage or first polarity voltage), a weak programming cycle is applied (typically with a positive voltage or a second polarity voltage). It is believed that the weak programming cycle causes or facilitates memory devices that have short-term or long-term memory erase tendencies to program (e.g. to re-enter the low resistance state). In some embodiments, after applying the erase voltage (typically negative) and erase current, instead of returning to zero bias immediately, the weak program voltage (typically positive) may be applied, followed by returning to zero bias. In other words, the weak programming pulse may be considered part of the erase process in some embodiments, or can be a separate operation from an erase process in other embodiments.

In various embodiments, the weak program signal may be smaller than a normal program signal (e.g., 25% to 75% program voltage, program current, program duration, or the like). In some embodiments, the weak program signal may be about the same or greater magnitude as a regular program, but the duration may be significantly shorter, e.g. a voltage impulse or pulse with very short duration, or fewer program pulses can be implemented. As one example, where a typical program signal utilizes multiple program pulses a weak program signal can utilize fewer program pulses, or a single program pulse. In still further embodiments, the weak program signal can combine a combination of the foregoing (e.g., fewer program pulses, shorter program duration, lower program voltage, lower program current, and so forth).

In further embodiments, following a weak program signal, memory cells of a memory device can optionally be measured to identify erase disturb bits. An erase pulse can be applied followed by a verify pulse (e.g., a read process) to identify any erase disturb bits. If an erase disturb is detected, the erase pulse can be repeated on the memory cells. Generally, the erase pulse can be repeated on all memory cells intended to be erased. In at least some embodiments, however, the erase pulse can be repeated on a portion of the memory cells (e.g., where operating temperature is below a threshold; see FIG. 11, infra). Erase signals can be repeated until no erase disturb bits are detected, or until a maximum erase cycle count is reached, in one or more embodiments.

In various embodiments, repeat erase cycles can have the same characteristics as a previous erase cycle(s) (e.g., with default or preset voltage magnitude, erase current, cycle duration, number of cycles, etc.), or can involve different (e.g., higher or lower) erase voltage magnitude(s), different (e.g., higher or lower) erase current(s), different (e.g., longer or shorter, fewer or more) erase cycles, repeated erase cycles, or the like. In some cases, if after multiple weak program cycles as described above, the memory cell cannot maintain an erase state, the memory cell may be marked as faulty and removed from a memory table, or the like.

FIG. 1 illustrates a block diagram of an example integrated circuit device 100 for an electronic device according to one or more embodiments of the present disclosure. Integrated circuit device 100 can comprise an array of two-terminal memory cells 102, connected at respective first ends thereof to one of a set of bitlines 104, and connected at respective second ends thereof to one of a set of sourcelines 108. For memory cells in a one transistor-one resistive cell configuration (1T1R), access to rows of memory cells can be facilitated by respective wordlines 106.

Operation circuitry 150 accesses respective bitlines 104 utilizing a multiplexer 130, and respective sourcelines 108 (and wordlines 106) via a decoder 120. To facilitate the memory operations disclosed herein, operation circuitry 150 can comprise a program circuit(s) 152, an erase circuit(s) 154 and a read circuit(s) 156.

Program circuit(s) 152 can be configured to apply a program process having default characteristics, including voltage, current, pulse duration or number of pulses (in the program process), or a suitable combination of the foregoing. Example default voltage for the program process can be in a range from 2.9 volts (v) to 4.0 v (e.g., 3 v, 3.3 v, 3.5 v, 3.8 v, 4 v, etc.), example default pulse duration can be 1 microsecond (us) to 100 us (e.g., 1 us, 5 us, 10 us, 25 us, 30 us, . . . ), and an example default number of pulses can be multiple pulses, ten pulses, 20 pulses, 50 pulses, 100 pulses, 500 pulses, or any suitable value or range there between.

Further, program circuit(s) 152 can be configured to apply a weak program process having at least one different characteristic from the default characteristics. The different characteristic(s) can comprise a different voltage, current, pulse duration or number of pulses, or a combination of the foregoing, however the weak program process will have a same polarity as the program process. It should be appreciated that in general the weak program process will have a reduced voltage magnitude (e.g., about 25% to about 75% reduced voltage magnitude, or suitable value there between), reduced current, reduced pulse duration or reduced number of pulses, but in at least some embodiments the weak program process can have at least one of these characteristics increased, with one or more others are reduced. As one example, the weak program process can have a voltage from about 1.6 v to about 2.6 v (e.g., 1.8 v, 2.0 v, 2.2 v, 2.3 v, 2.5 v, and so forth), a pulse duration from 1 us to 100 us (e.g., about 5 us, about 10 us, about 15 us, about 20 us, and so forth) and fewer than five pulses (e.g., two pulses, one pulse, etc.).

Erase circuit(s) 154 can be configured to apply an erase process having default characteristics, including voltage, current, pulse duration or number of pulses (in the erase process), or a suitable combination of the foregoing. For bipolar two-terminal memory cells 102, the erase process will generally have voltage of opposite polarity from the program process, but can have different magnitudes of the above characteristics as well. In various embodiments, erase circuit(s) 154 can generate an erase process with a voltage in a range of about −1.6 v to −2.6 v, a pulse duration in a range from about 1 us to about 100 us, and fewer than five pulses (e.g., three pulses, four pulses, one pulse, and so forth).

Read circuit(s) 156 can provide a read pulse configured to maintain—or otherwise avoid disturbing—a current state of two-terminal memory cell 102, while determining a resistance state thereof. The read pulse is typically smaller in magnitude than a program or erase pulse (e.g., 2.0 v or less;

1.5 v or less, and the like). In various embodiments, read pulses can be implemented by read circuit(s) 156 following a program pulse (or weak program pulse) implemented by program circuit(s) 152, or following an erase pulse implemented by erase circuit(s) 154.

FIG. 2 illustrates an example erase process 200 incorporating a weak program process in various embodiments of the present disclosure. Erase process 200 is arranged in a chart with columns: pulse number 202 and pulse type 204, total cell error 206, program error 208 and erase error 210 (also referred to herein as erase disturb). These categories are described for successive portions of erase process 200 listed in the rows of the chart.

Erase process 200 is applied to a plurality of non-volatile memory (NVM) cells, such as two-terminal memory cells 102 shown in FIG. 1. A number of NVM cells in an error state following each pulse is given under respective columns 206, 208, 210. Beginning with the first row a program process is applied to the NVM cells and all NVM cells are verified, resulting in zero errors. With the second row, an erase-verify pulse is applied erasing all NVM cells but one, producing one bit disturb under erase error 210 column (and total error 206 column). Erase process 200 can be configured to repeat the erase-verify pulse until no bit disturb states are detected, or until a maximum erase-verify count is reached. A second erase-verify pulse is performed, resulting in no bit disturb.

A first weak program (and verify) process is then implemented, resulting in 1017 erase disturb cells. A third erase-verify is performed, which successfully erases all NVM cells resulting in no bit disturb events. In various embodiments, multiple weak program processes can be implemented as part of erase process 200. The multiple weak program processes can be a predetermined fixed number, for example, or a variable number. The variable number can depend on number of erase disturb bits, operating temperature of a memory device, or the like, or a suitable combination of the foregoing.

As shown in FIG. 2, at row 6, a second weak program can be implemented, resulting in 580 erase disturb cells, followed by a fourth erase-verify pulse producing a single erase disturb. If an erase-verify limit is greater than one, a fifth erase-verify pulse is implemented as shown, resulting in zero erase disturb bits. A third weak-program process follows, resulting in 442 erase disturb bits. A sixth erase-verify process results in one erase disturb bit, which is corrected by a seventh erase-verify process.

A fourth weak program pulse is implemented in the twelfth row, causing 348 erase disturb bits. For erase process 200, an eighth erase-verify process produces no bit errors, and a final read process is implemented and erase process 200 ends. Erase process 200 can implement the final read process and end following a maximum number of weak program processes (e.g., four, in the example shown, or any suitable number between one and ten), or in response to fewer than a threshold erase disturb bits (e.g., fewer than 400, or 350, fewer than 50%, fewer than 40%, fewer than 30%, etc.), or a suitable combination of the foregoing.

FIG. 3 illustrates an example cell status 300 for erase process 200 of FIG. 2. Cell status 300 depicts erase or program state of four memory cells as example representatives of a population of memory cells upon which erase process 200 is implemented. In response to the operation pulses of erase process 200, cell status 300 gives example states of these representative memory cells. It should be understood that example cell status 300 is illustrative only and not intended to limit other suitable memory cell responses to erase process 200 of individual memory cells of a population of memory cells, including random or pseudo-random effects as would be understood by one of skill in the art. Rather, other suitable memory cell responses are within the scope of the present disclosure.

The representative memory cells includes memory cell 1 312, memory cell 2 314, memory cell 3 316 and memory cell 4 328 (referred to hereinafter collectively as memory cells 312-318). Each memory cell 312-318 is aligned with a column, and cells below each column define a status of a respective memory cell 312-318 for a set of operational pulses in rows of the depicted chart. Each row portrays a successive operational pulse of erase process 200 under the column heading pulse ID 302. Different sequences of operational pulses can be employed for other erase processes within the scope of the present disclosure, as would be understood by one of ordinary skill in the art or reasonably conveyed to one of ordinary skill by way of the context provided herein.

As with erase process 200 of FIG. 2, supra, the process starts following a program process that programs all memory cells 312-318. The dark shaded blocks with the letter 'P' indicate program states for respective memory cells 312-318. Initiating erase process 200 is a first erase cycle 322. Erase cycle 322 is defined as a number of erase-verify pulses (E&V) sufficient to erase all memory cells 312-318 up to a maximum number of erase-verify pulses. The erase-verify pulse includes an erase pulse and a verify pulse (e.g., read) to detect a program or erase state of each memory cell following the erase pulse. The maximum number of erase-verify pulses can be any number greater than zero; in the instant case the maximum number can be 2, 3, 4, or other suitable number. In response to an erase-verify pulse, a bit is verified as being in an erase state, or in a program state. If in the program state, the bit is determined to be an erase disturb. The first erase-verify pulse results in an erase disturb bit (memory cell 4 318, still having the program state following the first erase-verify pulse) and three erased bits. A second erase-verify pulse is therefore implemented which leaves all memory cells 312-318 in the erase state. Since no erase disturb bits remain, the first erase cycle 322 ends.

A first weak program (and verify) 324 is implemented on memory cells 312-318. Note that a weak program pulse is selected to have characteristics with lower voltage, pulse duration, number of pulses, or the like (or a suitable combination of the foregoing) as compared with a normal program operation. As such, the weak program is expected not to change an erase state of a suitably erased memory cell, and thus memory cells that become programmed in response to a weak program 324 are determined to be erase disturb bits. As shown in cell status 300 there are three memory cells 314, 316, 318 that become programmed following the first weak program 324, and thus are determined to be erase disturb bits. A second erase cycle 322 is implemented following first weak program 324, comprising a third erase-verify pulse, which results in all memory cells 312-318 successfully being erased. Accordingly, erase process 200 proceeds to a second weak program 324.

Following the second weak program 324, two memory cells 312 and 318 are shown as having become programmed, and therefore determined as erase disturb bits. A third erase cycle 322 is performed, in which a fourth erase-verify pulse results in memory cell 312 becoming erased (and memory cells 314 and 316 remaining erased), yet memory cell 318 is still an erase disturb bit. This results in a fifth erase-verify pulse for the third erase cycle 322. The fifth erase-verify pulse successfully erases memory cells 312-318.

A third weak program 324 results in only a single erase disturb: memory cell 218. A fourth erase cycle 322 initiates a sixth erase-verify pulse that results in no change to the erase disturb of memory cell 218. A seventh erase-verify pulse is implemented and results in all memory cells being erased. Following a fourth weak program 324, memory cell 218 is again disturbed, while memory cells 312-316 remain erased. A fifth erase cycle 322 and eighth erase-verify pulse results in all memory cells 312-318 being in the erase state.

Erase process 200 concludes with a final read following the fourth weak program 324 and fourth erase cycle 322. In other embodiments, more or fewer weak program and erase cycles can be implemented. In some embodiments, the number of weak program and erase cycles can be a fixed predetermined number. In still other embodiments, the number of weak program and erase cycles can depend at least in part on bit disturb responses of memory cells 312-318 to weak program signals, or successful erase responses of memory cells to erase-verify pulses, or a combination of the foregoing. In still other embodiments, the number of weak program and erase cycles can depend in part on a predetermined minimum number, a predetermined maximum number, bit disturb responses to weak program signals or successful erase responses to erase-verify pulses, or a suitable combination of the foregoing.

Figure 4:
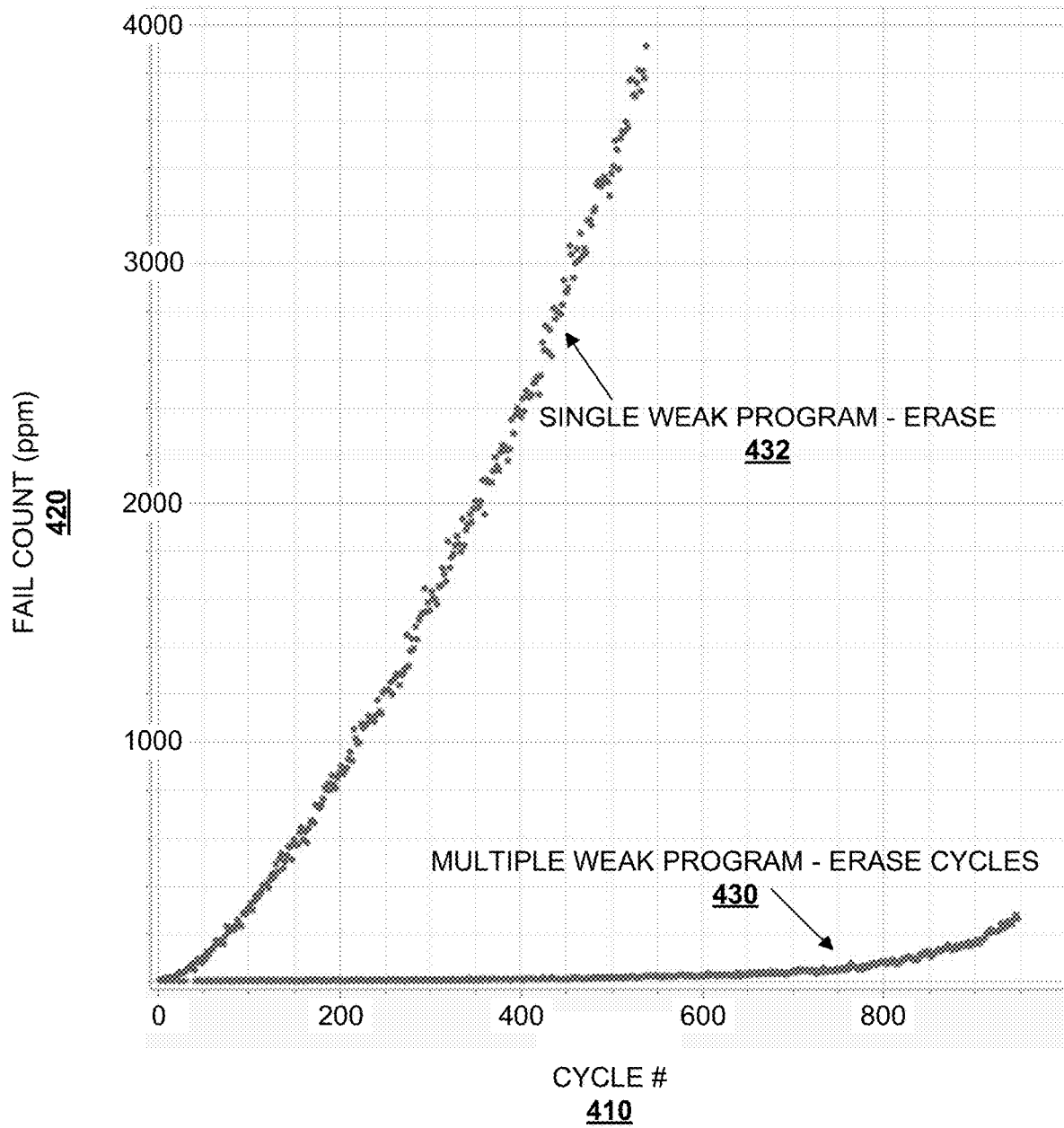
FIG. 4 illustrates an example graph of bit fail count versus erase cycle count for disclosed non-volatile memory cells in further embodiments.

FIG. 4 depicts an example graph 400 of fail count (or erase disturb) versus erase cycle count according to various aspects of the disclosed embodiments. On a vertical axis, graph 400 plots an erase failure count 420 (or a number of erase disturb bits) in parts per million (ppm) and on the horizontal axis, graph 400 plots a number of (normal) program and erase cycles. Additionally, graph 400 provides two relationships of fail count 420 versus cycle number 410: a first relationship 432 plotting erase disturb versus program-cycle count for a single weak program-erase cycle, and a second relationship 430 plotting erase disturb versus program-cycle count for erase process 200 having multiple weak program-erase cycles (four weak program-erase cycles in the example of erase process 200).

As is evident from graph 400, the first relationship 432 increases rapidly in fail count 420 as the program-erase cycle number 410 increases. The second relationship 430 associated with erase process 200 has a much lower fail count 420 for increasing program-erase cycle number 410. Erase process 200 improves cycle longevity of resistive switching memory cells many times over that of the first relationship 432 associated with the single weak program-erase process.

Figure 5:
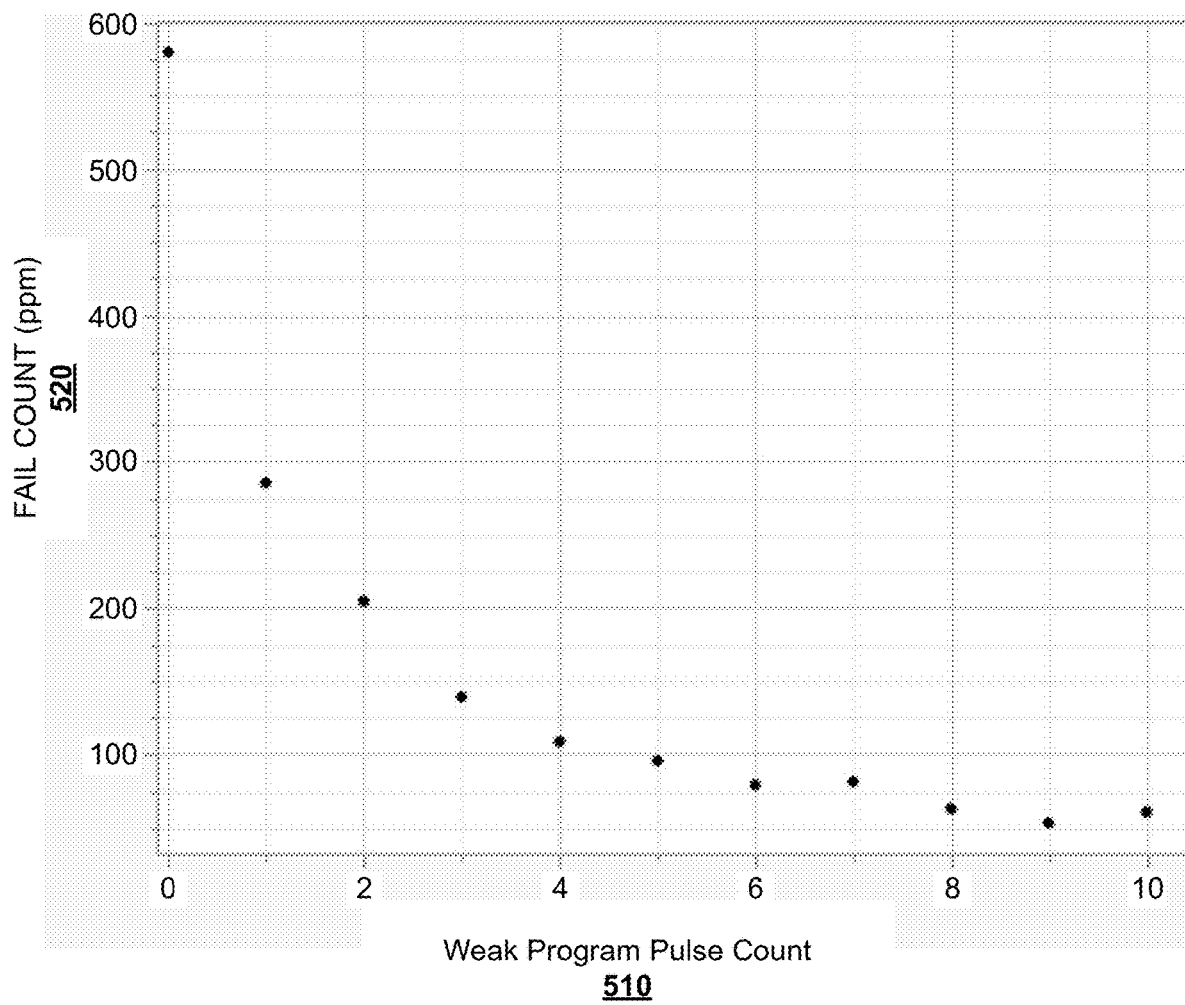
FIG. 5 depicts an example graph of bit fail count versus weak program count according to additional embodiments of the present disclosure.

FIG. 5 illustrates an example graph 500 of fail count 520 versus weak program pulse count 510, according to further embodiments of the present disclosure. At and below four weak program pulses, the fail count drops to about 100 ppm and below. This low fail count can generally be understood as being addressable with ECC correction or other correction technologies, and therefore not fatal to proper memory storage. In various embodiments, a number of weak program pulses for a disclosed erase process can be selected to reduce fail count 520 to a target level as shown by graph 500.

Figure 6:
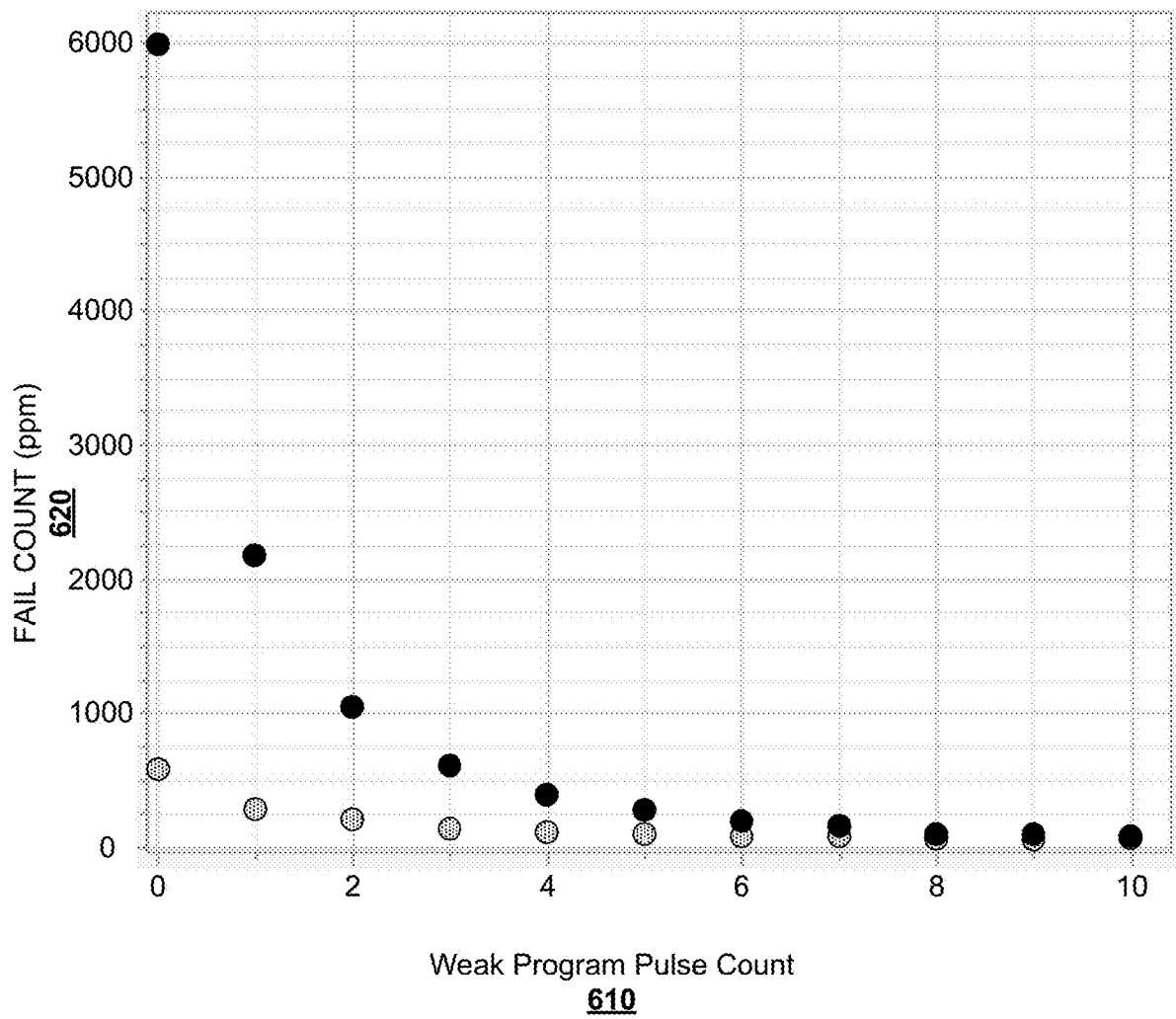
FIG. 6 illustrates an example graph of bit fail count versus weak program count for differing temperatures in an embodiment(s)

FIG. 6 depicts an example graph 600 of fail count 620 versus weak program pulse count 610 for different operating temperatures of a resistive switching memory device, in further embodiments of the present disclosure. The legend for FIG. 6 notes that the fail count 620 versus weak program pulse count 610 response at 125° C. is represented with darkened circles and at room temperature with lightly shaded circles. Graph 600 shows that fail count 620 increases significantly with higher operating temperatures.

For no weak program pulses, the fail count in ppm increases about tenfold at high temperatures. As the weak program pulse count increases, however, fail count decreases rapidly, even for high temperatures. At six weak program pulse events even the high temperature response is below a fail count of 250 ppm. At ten weak program pulses, the high temperature response is similar to that of the room temperature response. In one or more embodiments, a number of weak program pulses for a disclosed erase process can be selected at least in part based on operating temperature of a memory device upon which the erase process is implemented. For instance, where a fail count under 250 ppm is desired, a single weak program pulse can be implemented for an operating temperature of room temperature (e.g., about 20-25 degrees Celsius), whereas for an operating temperature at 125° C., five or six weak program pulses can be implemented. As another example, for a fail count under 100 ppm four or five weak program pulses can be utilized for a memory device at room temperature and 8 or 9 weak program pulses can be utilized for the same device at 125° C., and so forth.

Figure 7:
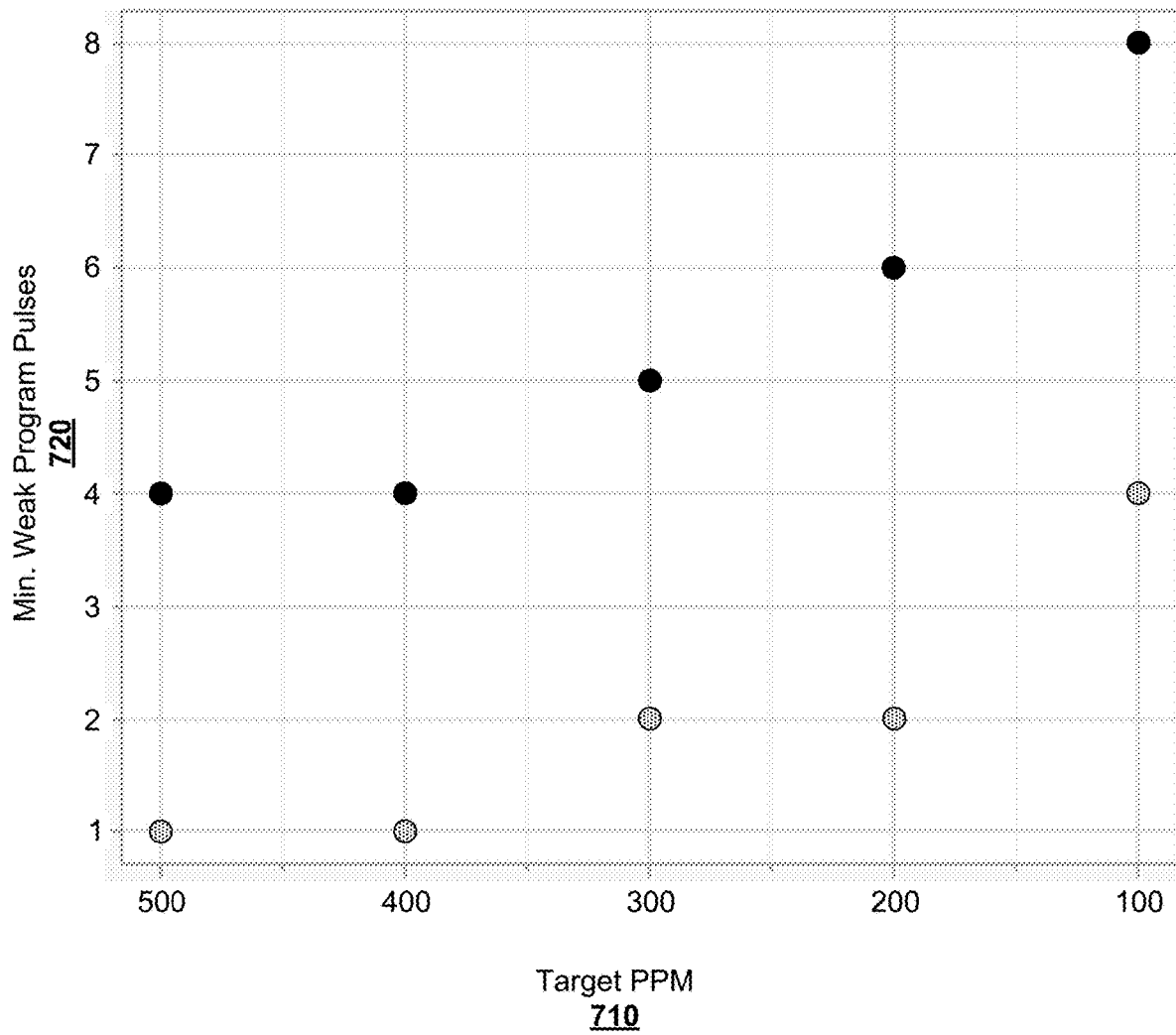
FIG. 7 illustrates an example graph of weak program count versus target erase disturb at differing temperatures in other embodiments.

FIG. 7 illustrates an example graph 700 of weak program count versus target erase disturb count in ppm. Graph 700 plots a minimum number of weak program pulses 720 on a vertical axis versus a target erase disturb 710 count (in ppm) on a horizontal axis. A legend for graph 700 identifies the dark circles of graph 700 as a response for an operating temperature at 125° C. and the lightly shaded circles as a response for room temperature. Graph 700 shows, at a given temperature, a minimum number of weak program pulses required for a disclosed erase process to achieve a target erase disturb value in ppm.

The diagrams included herein are described with respect to several circuits and arrays of resistive switching devices or an integrated circuit device(s) comprising multiple circuits or arrays. It should be appreciated that such diagrams can include those circuits, and arrays, specified therein, some of the specified circuits/arrays, or additional circuits/arrays not explicitly depicted but known in the art or reasonably conveyed to those of skill in the art by way of the context provided herein. Components of disclosed integrated circuit devices can also be implemented as sub-components of another disclosed component, whereas other components disclosed as sub-components can be separate components in various embodiments. Further, embodiments within a particular Figure of the present specification can be applied in part or in whole to other embodiments depicted in other Figures without limitation, subject only to suitability to achieving a disclosed function or purpose as understood by one of skill in the art, and vice versa.

In view of the exemplary diagrams described supra, process methods that can be implemented in accordance with the disclosed subject matter will be better appreciated with reference to the flow charts of FIGS. 8-11. While for purposes of simplicity of explanation, the methods of FIGS. 8-11 are shown and described as a series of blocks, it is to be understood and appreciated that the claimed subject matter is not limited by the order of the blocks, as some blocks may occur in different orders or concurrently with other blocks from what is depicted and described herein. Moreover, not all illustrated blocks may be required to implement the methods described herein, and in some embodiments additional steps known in the art or reasonably conveyed to one of ordinary skill in the art by way of the context provided herein can be implemented as part of a disclosed method within the scope of the present disclosure. Moreover, some steps illustrated as part of one process can be implemented for another process where suitable; other steps of one or more processes can be added or substituted in other processes disclosed herein within the scope of the present disclosure. Additionally, it should be further appreciated that the methods disclosed throughout this specification are capable of being stored on an article of manufacture to facilitate transporting and transferring such methods to an electronic device, stored in embedded memory within the electronic device, and so forth. The term article of manufacture, as used, is intended to encompass a computer program accessible from any computer-readable device, device in conjunction with a carrier, or storage medium, or the like.

Figure 8:
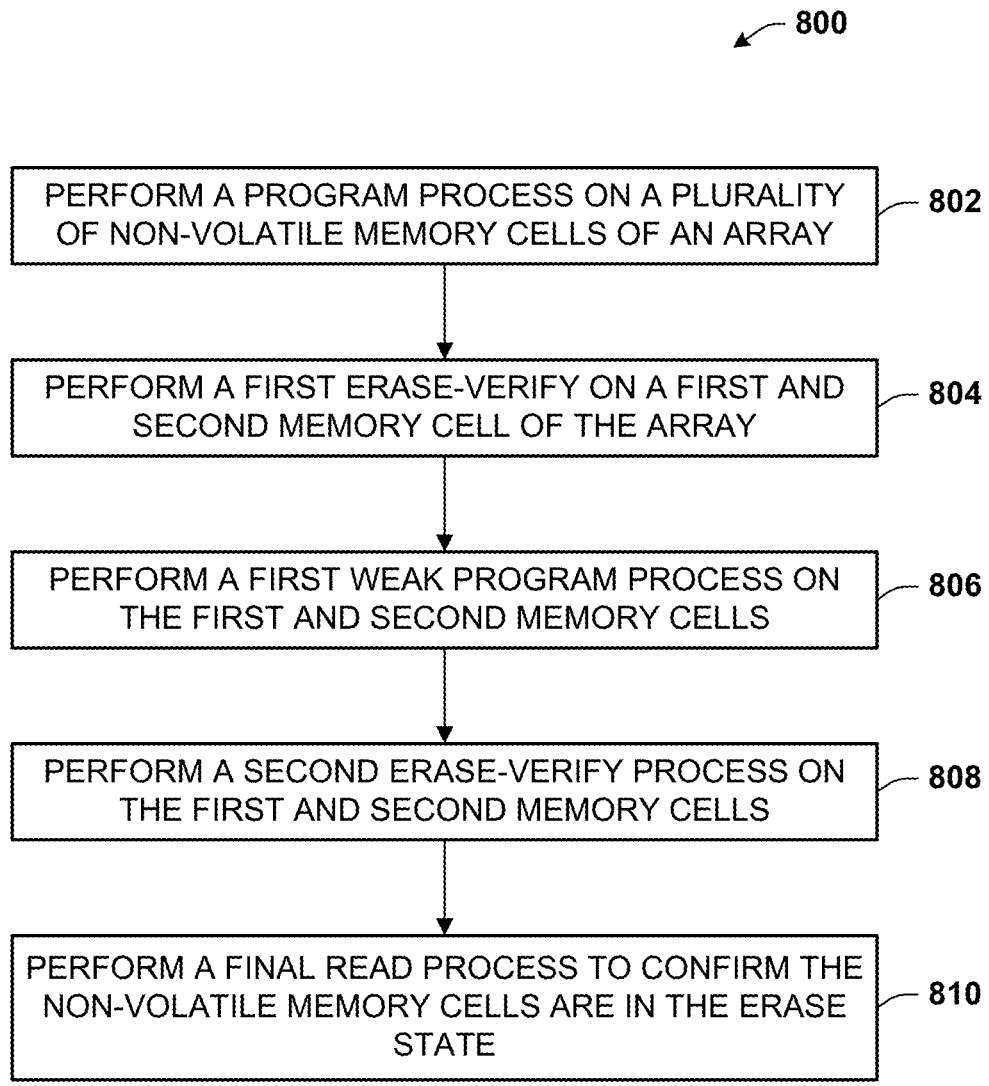
FIG. 8 depicts a flowchart of a sample method for an erase process utilizing one or more weak program pulses, in another embodiment(s)

FIG. 8 illustrates a flowchart of an example method 800 for reducing bit disturb associated with erasing memory cells of a non-volatile two-terminal resistive switching memory device, according to disclosed embodiments. At 802, method 800 can comprise performing a program process on a plurality of non-volatile memory cells of an array of non-volatile memory cells. The non-volatile memory cells can be two-terminal resistive switching memory devices of an array of two-terminal resistive switching memory devices, in various embodiments. The plurality of non-volatile memory cells includes at least two memory cells: a first non-volatile memory cell and a second non-volatile memory cell.

At 804, method 800 can comprise performing a first erase-verify process on the first and second non-volatile memory cells. In one or more embodiments, the first erase-verify process can further comprise applying an erase process to the first and second non-volatile memory cells, and reading the first and second non-volatile memory cells to determine whether both memory cells are in an erase state. At 806, method 800 can comprise performing a first weak program process on the first and second non-volatile memory cells. The weak program process can be in response to determining the first and second memory cells are in the erase state, in some disclosed embodiments, or in response to reaching a maximum erase pulse for the erase-verify process. In at least some embodiments of the present disclosure, the weak program process can comprise at least one of: a lower pulse count than the program process; a lower voltage magnitude than the program process; or a lower pulse duration than the program process.

At 808, method 800 can comprise performing a second erase-verify process on the first and second non-volatile memory cells. In further embodiments, performing the second erase-verify process further comprises applying the erase process to the first and second non-volatile memory cells, and reading the first and second non-volatile memory cells to determine whether both memory cells are in the erase state.

At 810, method 800 can comprise performing a final read process to determine both the first and the second non-volatile memory cells are in the erase state.

In an embodiment, in response to determining both memory cells are not in the erase state following the first erase-verify process, method 800 can further comprise repeating the first erase-verify process on the first and second non-volatile memory cells. Repeating the first erase-verify process can additionally comprise performing the erase process and reading the first and second non-volatile memory cells until the reading determines both memory cells are in the erase state.

In another embodiment, method 800 can further comprise, following performing the second erase-verify process, performing a second weak program process on the first and second memory cells and performing a third erase-verify process on the first and second non-volatile memory cells. Still further, in response to detecting an erase disturb state for the first non-volatile memory cell or for the second non-volatile memory cell in response to the third erase-verify process, method 800 can comprise performing an additional weak program process and erase-verify process on the first and second non-volatile memory cells. Moreover, in at least one embodiment, method 800 can also comprise repeating the additional weak program process and the erase-verify process until no erase disturb state is detected for the first non-volatile memory cell or the second non-volatile memory cell.

In some aspects of the disclosed embodiments, method 800 can further comprise repeating the weak program process and the erase-verify process on both the first and second non-volatile memory cells a predetermined number of times before performing the final read process. As an example, the predetermined number of times can be a number selected from a group consisting of: two, three, four, five, six, seven, eight, nine and ten.

Figure 9:
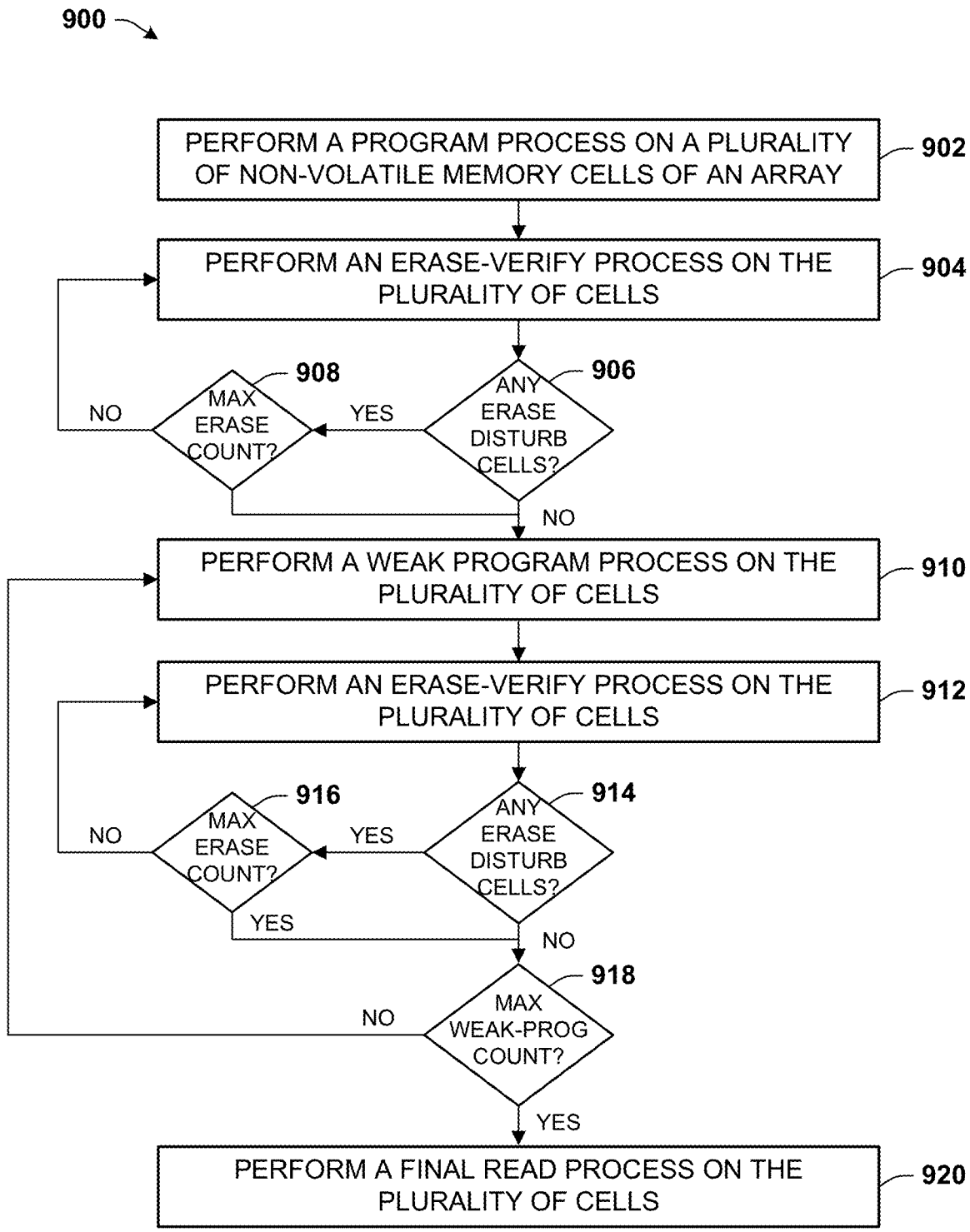
FIG. 9 illustrates a flowchart of an example method for an erase process utilizing a weak program cycle and erase-verify process in still other embodiments.

FIG. 9 depicts a flowchart of an example method 900 according to still further embodiments of the present disclosure. At 902, method 900 can comprise performing a program process on a plurality of non-volatile memory cells of an array of non-volatile memory cells. At 904, method 900 can comprise performing an erase-verify process on the plurality of non-volatile memory cells, and at 906 a determination is made as to whether any erase disturb cells are detected in response to the erase-verify process. If no erase disturb cells are detected method 900 can proceed to reference number 910. If an erase disturb cell is detected, method 900 proceeds to reference number 908 and can comprise determining whether a maximum erase count has been met. If no, method 900 returns to reference number 904; otherwise, method 900 proceeds to 910.

At 910, method 900 can comprise performing a weak program process on the plurality of memory cells. At 912, method 900 can comprise performing an erase-verify process on the plurality of memory cells in response to the weak program process. At 914, a determination is made as to whether any erase disturb cells are identified following the erase-verify process. If no, method 900 proceeds to 918. If an erase disturb cell is identified, method 900 can proceed to 916 and determine whether a maximum erase count is reached following the weak program process at reference number 910. If not, method 900 returns to 912; otherwise method 900 proceeds to 918.

At 918, a determination is made as to whether a maximum weak program count is reached. If not, method 900 returns to reference number 910. If the maximum weak program count is reached, method 900 proceeds to 920 and can comprise performing a final read process on the plurality of memory cells. The final read process can confirm the plurality of memory cells are in the erase state.

Figure 10:
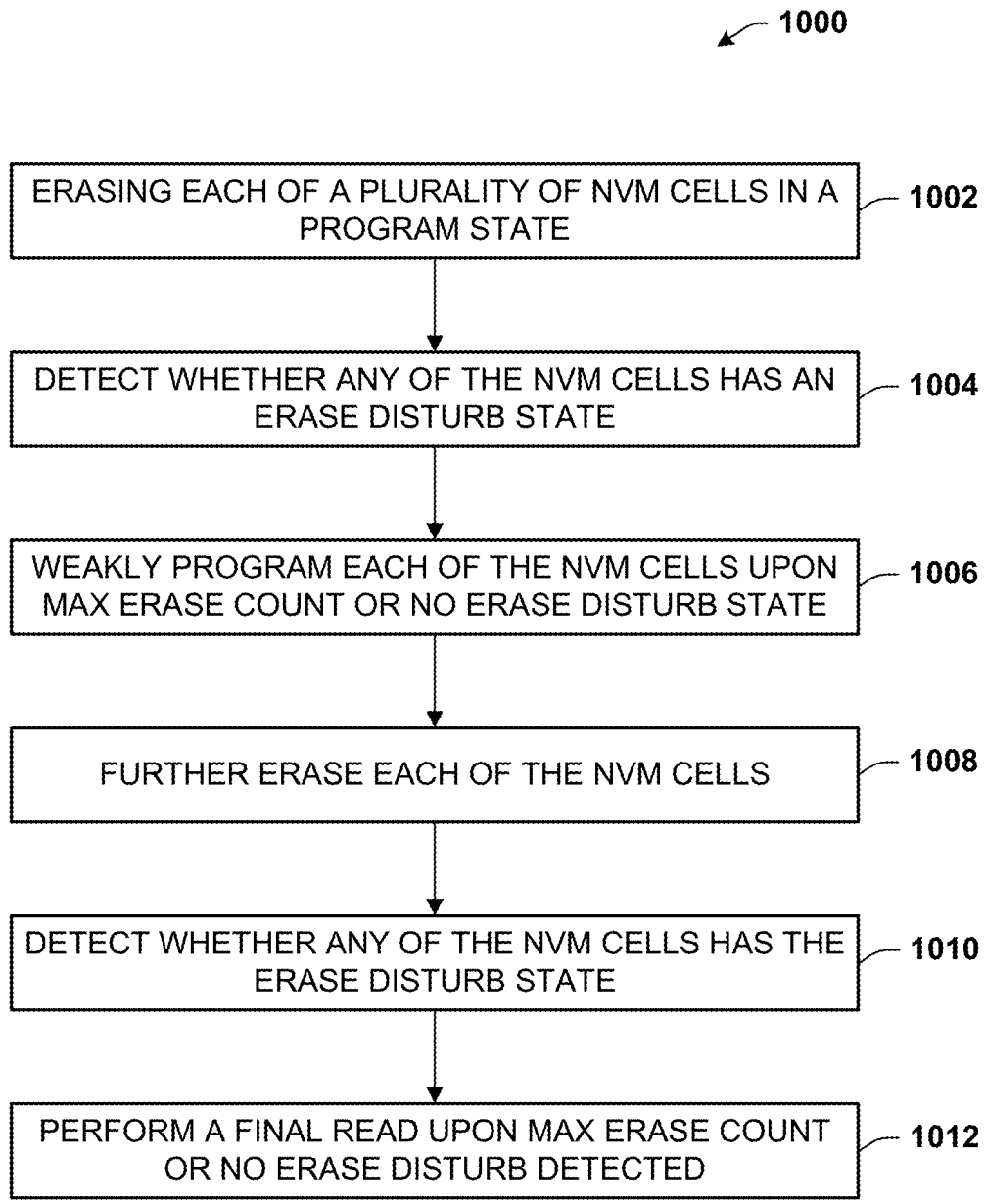
FIG. 10 depicts a flowchart of a sample method for erasing resistive switching memory cells utilizing one or more weak program pulses in various aspects of the disclosure.

FIG. 10 depicts a flowchart of a sample method 1000 for erasing a non-volatile memory device. At 1002, method 1000 can comprise erasing each of a plurality of non-volatile memory cells (NVM cells) of a memory device that are in a program state. At 1004, method 1000 can comprise detecting whether any of the plurality of NVM cells is associated with an erase disturb state following the erasing. At 1006, method 1000 can comprise weakly programming each of the plurality of NVM cells with a polarity opposite that of the erasing in response to detecting no erase disturb states. At 1008, method 1000 can comprise further erasing each of the plurality of non-volatile memory cells, and at 1010 method 1000 can comprise detecting whether any of the NVM cells is associated with the erase disturb state in response to the further erasing. At 1012, method 1000 can comprise reading states of the plurality of NVM cells in response to detecting no erase disturb states associated with any of the NVM cells.

In a further embodiment, method 1000 can comprise re-erasing each of the plurality of non-volatile memory cells and detecting whether the erase disturb state is associated with any of the plurality of NVM cells following the re-erasing. Further, the re-erasing and detecting can be in response to detecting the erase disturb state is associated with any of the plurality of NVM cells following the erasing each of the plurality of NVM cells at reference number 1002, or following the further erasing each of the plurality of NVM cells at reference number 1008.

In still additional embodiments, method 1000 can further comprise repeating the re-erasing and the detecting until the erase disturb state is detected for none of the plurality of NVM cells. In an alternative embodiment, the re-erasing and the detecting can be repeated until a maximum re-erase count is reached for the re-erasing and detecting, wherein the maximum re-erase count is one or larger.

In one or more other aspects of the disclosed embodiments, method 1000 can comprise repeating the weakly programming each of the plurality of NVM cells and the further erasing each of the plurality of NVM cells prior to the reading erase states of the plurality of NVM cells. Additionally, method 1000 can comprise repeating the weakly programming and the further erasing a predetermined number of times selected from a range of one to nine times.

In another disclosed embodiment(s), method 1000 can further comprise receiving temperature data pertaining to the non-volatile memory device and comparing the temperature data to a threshold temperature value. Method 1000 can also comprise conditioning the repeating the weakly programming and the further erasing on the temperature data indicating the non-volatile memory device is operating at a greater temperature than the threshold temperature value.

In yet another disclosed embodiment, erasing comprises an erase process defined by one or more of the following: a negative polarity voltage in a voltage range of negative 1.6 v to negative 2.6 v, a pulse duration within a duration range from 1 microsecond (us) to 100 us, or a single pulse. In a further embodiment, a program process utilized by the non-volatile memory device to cause the plurality of NVM cells to have the program state is defined by the following: a positive polarity voltage in a second range of positive 2.9 v to positive 3.8 v; a pulse duration within a second duration range of 1 us to 10 us; and two or more pulses having the positive polarity voltage of the second voltage range and the pulse duration of the second duration range.

Figure 11:
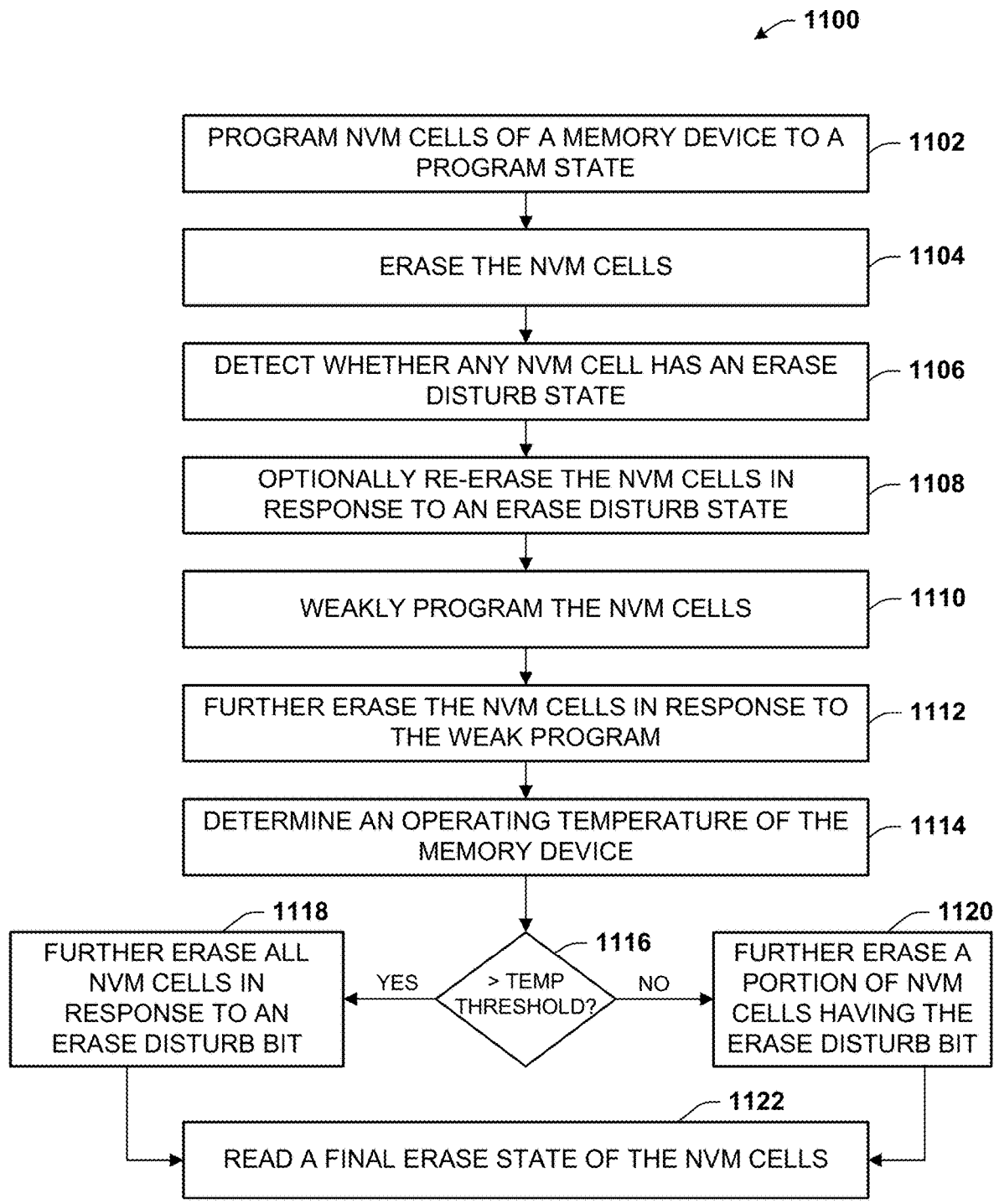
FIG. 11 illustrates a flowchart of an example method for erasing non-volatile memory cells at least in part dependent upon temperature of a memory device.

As shown in FIG. 11, disclosed is a flowchart of an example method 1100 according to still further embodiments of the present disclosure. At 1102, method 1100 can comprise programming NVM cells of a non-volatile memory device to a program state, and at 1104, method 1100 can comprise erasing the NVM cells. At 1106, method 1100 can comprise detecting whether any of the NVM cells have an erase disturb state. At 1108, method 1100 can comprise optionally re-erasing the NVM cells in response to detecting an erase disturb state for one of the NVM cells.

At 1110, method 1000 can comprise weakly programming the NVM cells. The weakly programming can utilize a voltage, pulse duration or pulse count less than that of the programming at reference number 1102. At 1112, method 1100 can comprise further erasing the NVM cells in response to the weakly programming.

In addition, at 1114 method 1100 can comprise determining an operating temperature of the memory device. As an example, determining the operating temperature can comprise receiving temperature data indicative of an operating temperature of the non-volatile memory device in comparison with a temperature threshold value or range of threshold values. At 1116, a determination is made as to whether the operating temperature is greater than the temperature threshold. If greater than the operating temperature, method 1100 can proceed to 1118 and can comprise further erasing all NVM cells in response to an erase disturb bit. If less than the operating temperature, method 1100 can proceed to 1120 and can comprise further erasing a portion of NVM cells having the erase disturb bit. At 1122, method 1100 can comprise reading a final erase state of the NVM cells. In at least one additional embodiment, in response to the operating temperature being at or above the temperature threshold value or range of threshold values, repeating the weakly programming and the further erasing one or more times prior to reading the final erase state of the non-volatile memory cells.

Example Operating Environments

Figure 12:
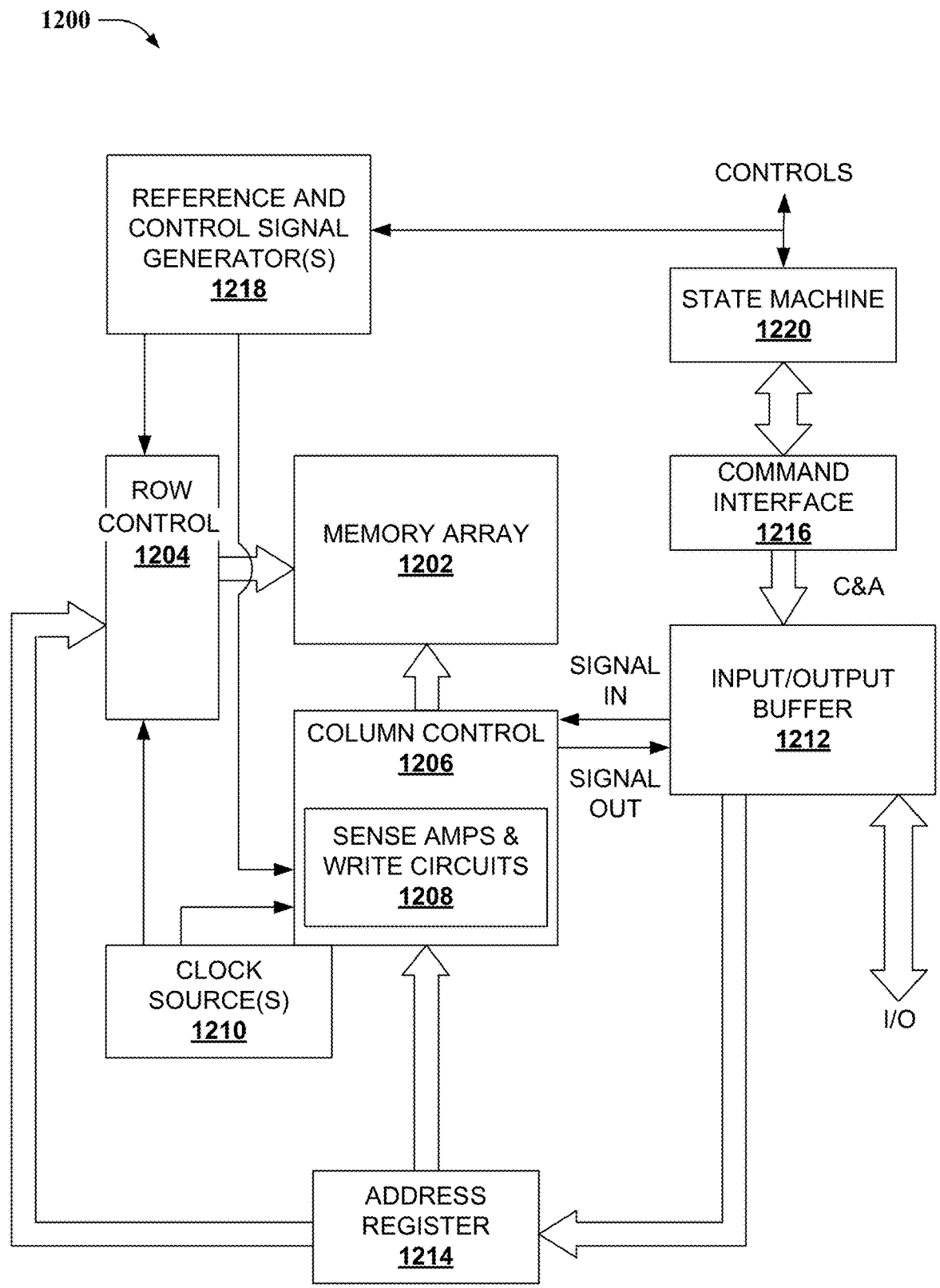
FIG. 12 illustrates a block diagram of an example operating and control environment for a memory device according to aspects of the present disclosure.

FIG. 12 illustrates a block diagram of an example operating and control environment 1200 for a memory array 1202 of a memory device according to aspects of the subject disclosure. Control environment 1200 and memory array 1202 can be formed within a single semiconductor die in some embodiments, although the subject disclosure is not so limited and in other embodiments some components of control environment 1200 can be formed on a separate semiconductor die communicatively linked to the single semiconductor die. In at least one aspect of the subject disclosure, memory array 1202 can comprise memory selected from a variety of memory cell technologies. In at least one embodiment, memory array 1202 can comprise a two-terminal memory technology, arranged in a compact two or three-dimensional architecture. Suitable two-terminal memory technologies can include resistive-switching memory, conductive-bridging memory, phase-change memory, organic memory, magneto-resistive memory, or the like, or a suitable combination of the foregoing. In a further embodiment, the two-terminal memory technology can be a two-terminal resistive switching technology.

A column controller 1206 including, sense amps and write circuits 1208 can be formed adjacent to memory array 1202. Moreover, column controller 1206 can be configured to activate (or identify for activation) a subset of bit lines of memory array 1202. Column controller 1206 can utilize a control signal(s) provided by a reference and control signal generator(s) 1218 to activate, as well as operate upon, respective ones of the subset of bitlines, applying suitable program, erase or read voltages to those bitlines. Non-activated bitlines can be kept at an inhibit voltage (also applied by reference and control signal generator(s) 1218), to mitigate or avoid bit-disturb effects on these non-activated bitlines.

In addition, operating and control environment 1200 can comprise a row controller 1204. Row controller 1204 can be formed adjacent to and electrically connected with word lines of memory array 1202. Also utilizing control signals of reference and control signal generator(s) 1218, row controller 1204 can select one or more rows of memory cells with a suitable selection voltage. Moreover, row controller 1204 can facilitate program, erase or read operations by applying suitable voltages at selected word lines.

Sense amps and write circuits 1208 can read data from and write data to (respectively), the activated memory cells of memory array 1202, which are selected by column control 1206 and row control 1204. Data read out from memory array 1202 can be provided to an input/output buffer 1212. Likewise, data to be written to memory array 1202 can be received from the input/output buffer 1212 and written to the activated memory cells of memory array 1202.

A clock source(s) 1210 can provide respective clock pulses to facilitate timing for read, write, and program operations of row controller 1204 and column controller 1206. Clock source(s) 1210 can further facilitate selection of word lines or bit lines in response to external or internal commands received by operating and control environment 1200. Input/output buffer 1212 can comprise a command and address input, as well as a bidirectional data input and output. Instructions are provided over the command and address input, and the data to be written to memory array 1202 as well as data read from memory array 1202 is conveyed on the bidirectional data input and output, facilitating connection to an external host apparatus, such as a computer or other processing device (not depicted, but see e.g., computer 1302 of FIG. 13, infra).

Input/output buffer 1212 can be configured to receive write data, receive an erase instruction, receive a status or maintenance instruction, output readout data, output status information, and receive address data and command data, as well as address data for respective instructions. Address data can be transferred to row controller 1204 and column controller 1206 by an address register 1214. In addition, input data is transmitted to memory array 1202 via signal input lines between column control 1206 and input/output buffer 1212, and output data is received from memory array 1202 via sense amps (1208) and provided on signal output lines to input/output buffer 1212. Input data can be received from the host apparatus, and output data can be delivered to the host apparatus via the I/O bus.

Commands received from the host apparatus can be provided to a command interface 1216. Command interface 1216 can be configured to receive external control signals from the host apparatus and determine whether data input to the input/output buffer 1212 is write data, a command, or an address. Input commands can be transferred to a state machine 1220.

State machine 1220 can be configured to manage programming and reprogramming of memory array 1202. Instructions provided to state machine 1220 are implemented according to control logic configurations, enabling state machine 1220 to manage read, write, erase, data input, data output, and other functionality associated with memory cell array 1202. In some aspects, state machine 1220 can send and receive acknowledgments and negative acknowledgments regarding successful receipt or execution of various commands. In further embodiments, state machine 1220 can decode and implement status-related commands, decode and implement configuration commands, and so on.

To implement read, write, erase, input, output, etc., functionality, state machine 1220 can control clock source(s) 1210 or reference and control signal generator(s) 1218. Control of clock source(s) 1210 can cause output pulses configured to facilitate row controller 1204 and column controller 1206 implementing the particular functionality. Output pulses can be transferred to selected bit lines by column controller 1206, for instance, or word lines by row controller 1204, for instance.

Figure 13:
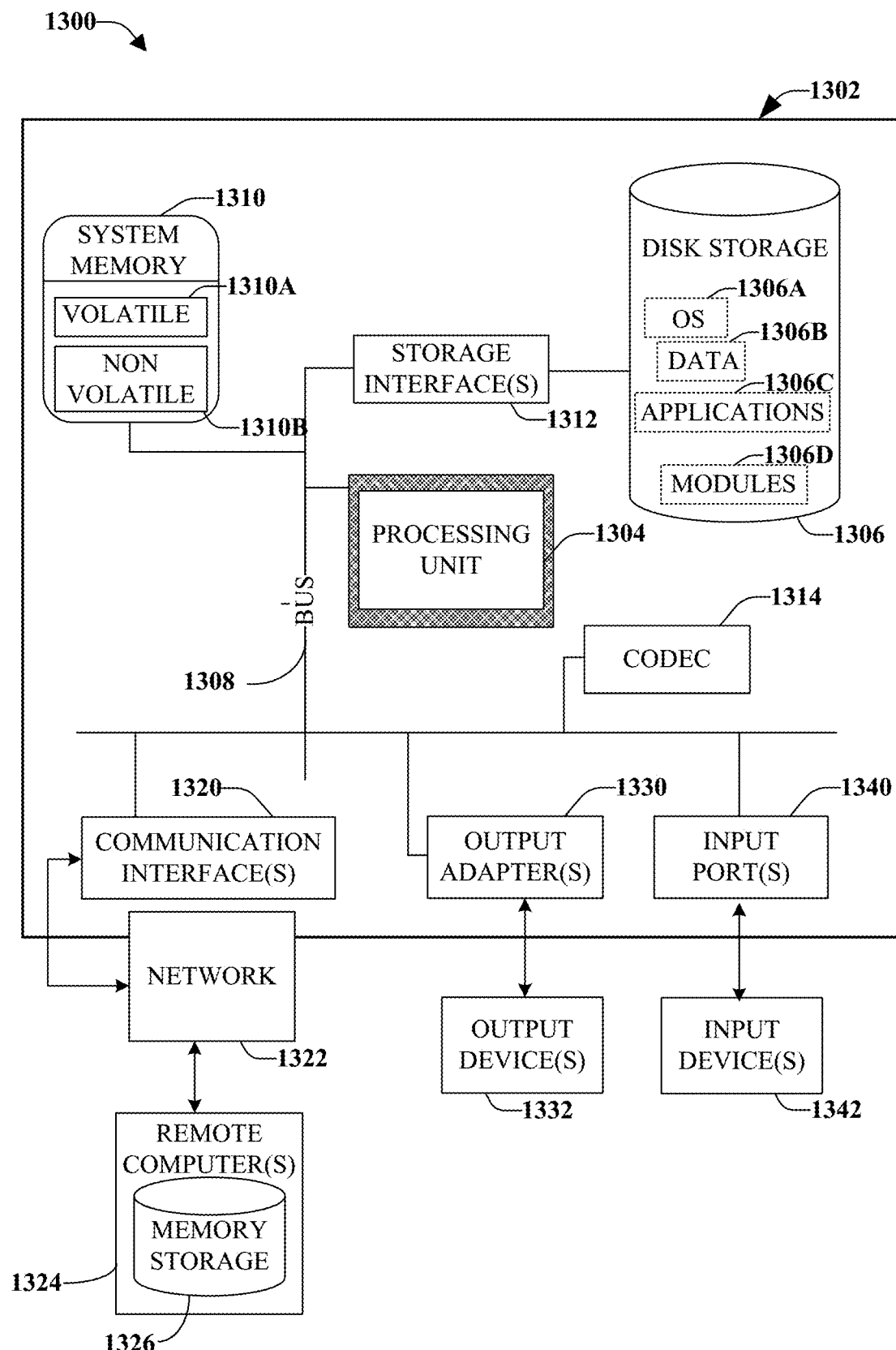
FIG. 13 depicts a block diagram of an example computing environment facilitating one or more further aspects of the disclosure.

In connection with FIG. 13, the systems, devices, or processes described herein can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

With reference to FIG. 13, a suitable environment 1300 for implementing various aspects of the claimed subject matter includes a computer 1302. The computer 1302 includes a processing unit 1304, a system memory 1310, a codec 1314, and a system bus 1308. The system bus 1308 couples system components including, but not limited to, the system memory 1310 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1310 includes volatile memory 1310A and non-volatile memory 1310B. The basic input/output system (BIOS), containing the basic routines to transfer information between elements within the computer 1302, such as during start-up, is stored in non-volatile memory 1310B. In addition, according to present innovations, codec 1314 may include at least one of an encoder or decoder, wherein the at least one of an encoder or decoder may consist of hardware, software, or a combination of hardware and software. Although, codec 1314 is depicted as a separate component, codec 1314 may be contained within non-volatile memory 1310B. By way of illustration, and not limitation, non-volatile memory 1310B can include read only memory (ROM), programmable ROM (PROM), electrically programmable ROM (EPROM), electrically erasable programmable ROM (EEPROM), or flash memory, two-terminal memory, and so on. Volatile memory 1310A includes random access memory (RAM), and in some embodiments can embody a cache memory. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) among others.

Computer 1302 may also include removable/non-removable, volatile/non-volatile computer storage medium. FIG. 13 illustrates, for example, disk storage 1306. Disk storage 1306 includes, but is not limited to, devices like a magnetic disk drive, solid state disk (SSD) floppy disk drive, tape drive, Jaz drive, Zip drive, LS-100 drive, flash memory card, or memory stick, universal serial bus (USB) memory, mini-USB memory, micro-USB memory and other modalities of non-volatile memory hardware. In addition, disk storage 1306 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1306 to the system bus 1308, a removable or non-removable interface is typically used, such as storage interface 1312. It is appreciated that storage devices 1306 can store information related to a user. Such information might be stored at or provided to a server or to an application running on a user device. In one embodiment, the user can be notified (e.g., by way of output device(s) 1332) of the types of information that are stored to disk storage 1306 or transmitted to the server or application. The user can be provided the opportunity to opt-in or opt-out of having such information collected and/or shared with the server or application (e.g., by way of input from input device(s) 1342).

It is to be appreciated that FIG. 13 describes software that acts as an intermediary between users and the basic computer resources described in the suitable operating environment 1300. Such software includes an operating system 1306A. Operating system 1306A, which can be stored on disk storage 1306, acts to control and allocate resources of the computer system 1302. Applications 1306C take advantage of the management of resources by operating system 1306A through program modules 1306D, and program data 1306D, such as the boot/shutdown transaction table and the like, stored either in system memory 1310 or on disk storage 1306. It is to be appreciated that the claimed subject matter can be implemented with various operating systems or combinations of operating systems.

A user enters commands or information into the computer 1302 through input device(s) 1342. Input devices 1342 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via input port(s) 1340. Input port(s) 1340 include, for example, a serial port, a parallel port, a game port, and a universal serial bus (USB). Output device(s) 1332 use some of the same type of ports as input device(s) 1342. Thus, for example, a USB port may be used to provide input to computer 1302 and to output information from computer 1302 to an output device 1332. Output adapter 1330 is provided to illustrate that there are some output devices 1332 like monitors, speakers, and printers, among other output devices 1332, which require special adapters. The output adapters 1330 include, by way of illustration and not limitation, video and sound cards that provide a means of connection between the output device 1332 and the system bus 1308. It should be noted that other devices and/or systems of devices provide both input and output capabilities such as remote computer(s) 1338.

Computer 1302 can operate in a networked environment using logical connections to one or more remote computers, such as remote computer(s) 1324. The remote computer(s) 1324 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1326 is illustrated with remote computer(s) 1324. Remote computer(s) 1324 is logically connected to computer 1302 through a network 1322 and then connected via communication interface(s) 1320. Network 1322 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication interface(s) 1320 refers to the hardware/software employed to connect the network 1322 to the bus 1308. While communication interface(s) 1320 is shown for illustrative clarity inside computer 1302, it can also be external to computer 1302. The hardware/software necessary for connection to the network 1322 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules or stored information, instructions, or the like can be located in local or remote memory storage devices.

Moreover, it is to be appreciated that various components described herein can include electrical circuit(s) that can include components and circuitry elements of suitable value in order to implement the embodiments of the subject disclosure. Furthermore, it can be appreciated that many of the various components can be implemented on one or more IC chips. For example, in one embodiment, a set of components can be implemented in a single IC chip. In other embodiments, one or more of respective components are fabricated or implemented on separate IC chips.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments include a system as well as a computer-readable medium having computer-executable instructions for performing the acts and/or events of the various processes.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising".

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In other embodiments, combinations or sub-combinations of the above disclosed embodiments can be advantageously made. The block diagrams of the architecture and flow charts are grouped for ease of understanding. However, it should be understood that combinations of blocks, additions of new blocks, re-arrangement of blocks, and the like are contemplated in alternative embodiments of the present disclosure.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for reducing bit disturb associated with erasing memory cells of a non-volatile two-terminal resistive switching memory device, comprising:
    implementing a program process on a plurality of non-volatile memory cells of an array of non-volatile two-terminal resistive switching memory cells, the plurality comprising a first non-volatile memory cell and a second non-volatile memory cell;
    performing a first erase-verify process on the first and second non-volatile memory cells, further comprising:
        applying an erase process to the first and second non-volatile memory cells, and
        reading the first and second non-volatile memory cells to determine whether both memory cells are in an erase state;
    in response to determining both memory cells are in the erase state, performing a first weak program process on the first and second non-volatile memory cells, wherein the first weak program process comprises at least one of:
        a lower pulse count than the program process,
        a lower voltage magnitude than the program process, or
        a lower pulse duration than the program process;
    performing a second erase-verify process on the first and second non-volatile memory cells, further comprising:
        applying the erase process to the first and second non-volatile memory cells, and
        reading the first and second non-volatile memory cells to determine whether both memory cells are in the erase state; and
    perform a final read process to determine both the first and second non-volatile memory cells are in the erase state.

2. The method of claim 1, further comprising, in response to determining both memory cells are not in the erase state following the first erase-verify process: repeating the first erase-verify process on the first and second non-volatile memory cells.

3. The method of claim 2, wherein repeating the first erase-verify process further comprises performing the erase process and reading the first and second non-volatile memory cells until the reading determines both memory cells are in the erase state.

4. The method of claim 1, further comprising, following performing the second erase-verify process, performing a second weak program process on the first and second memory cells and performing a third erase-verify process on the first and second non-volatile memory cells.

5. The method of claim 4, further comprising, in response to detecting an erase disturb state for the first non-volatile memory cell or the second non-volatile memory cell in response to the third erase-verify process, performing an additional weak program process and erase-verify process on the first and second non-volatile memory cells.

6. The method of claim 5, further comprising repeating the additional weak program process and erase-verify process until no erase disturb state is detected for the first non-volatile memory cell or the second non-volatile memory cell.

7. The method of claim 1, further comprising repeating the first weak program process and erase-verify process on both the first and second non-volatile memory cells a predetermined number of times before performing the final read process.

8. The method of claim 7, wherein the predetermined number of times is a number selected from a group consisting of: two, three, four, five, six, seven, eight, nine and ten.

9. A method of erasing a non-volatile memory device, comprising:
    erasing each of a plurality of non-volatile memory cells of a memory device that are in a program state;
    detecting whether any of the plurality of non-volatile memory cells is associated with an erase disturb state following the erasing;
    weakly programming each of the plurality of non-volatile memory cells with a polarity opposite that of the erasing in response to detecting no erase disturb state;
    further erasing each of the plurality of non-volatile memory cells;
    detecting whether any of the non-volatile memory cells is associated with the erase disturb state in response to the further erasing; and
    reading erase states of the plurality of non-volatile memory cells in response to detecting no erase disturb states associated with any of the non-volatile memory cells.

10. The method of claim 9, further comprising, in response to detecting the erase disturb state is associated with any of the plurality of non-volatile memory cells following the erasing each of the plurality of non-volatile memory cells or following the further erasing each of the plurality of non-volatile memory cells:
    re-erasing each of the plurality of non-volatile memory cells; and
    detecting whether the erase disturb state is associated with any of the plurality of non-volatile memory cells following the re-erasing.

11. The method of claim 10, further comprising repeating the re-erasing and the detecting until the erase disturb state is detected for none of the plurality of non-volatile memory cells.

12. The method of claim 10, further comprising repeating the re-erasing and the detecting until a maximum re-erase count is reached for the re-erasing and detecting, wherein the maximum re-erase count is one or larger.

13. The method of claim 9, further comprising repeating the weakly programming each of the plurality of non-volatile memory cells and the further erasing each of the plurality of non-volatile memory cells prior to the reading erase states of the plurality of non-volatile memory cells.

14. The method of claim 13, further comprising repeating the weakly programming and the further erasing a predetermined number of times, wherein the predetermined number is selected from a range of one to nine.

15. The method of claim 13, further comprising:
receiving temperature data pertaining to the non-volatile memory device and comparing the temperature data to a threshold temperature value; and
conditioning the repeating the weakly programming and the further erasing on the temperature data indicating the non-volatile memory device is operating at a greater temperature than the threshold temperature value.

16. The method of claim 9, wherein the erasing comprises an erase process defined by one or more of the following:
a negative polarity voltage in a voltage range of negative 1.6 volts (v) to negative 2.6 v;
a pulse duration within a duration range from 1 microsecond (us) to 100 us; or
a single pulse.

17. The method of claim 9, wherein the weakly programming comprises a program process defined by one or more of the following:
a positive polarity voltage in a voltage range of positive 1.6 v to positive 2.6 v;
a pulse duration within a duration range from 1 us to 100 us; or
a single pulse.

18. The method of claim 17, wherein a program process utilized by the non-volatile memory device to cause the plurality of non-volatile memory cells to have the program state is defined by the following:
a positive polarity voltage in a second voltage range of positive 2.9 v to positive 3.8 v;
a pulse duration within a second duration range of 1 us to 10 us; and
two or more pulses having the positive polarity voltage of the second voltage range and the pulse duration of the second duration range.

19. A method, comprising:
programming non-volatile memory cells of a non-volatile memory device to a program state;
erasing the non-volatile memory cells;
detecting whether any of the non-volatile memory cells have an erase disturb state;
optionally re-erasing the non-volatile memory cells in response to detecting an erase disturb state for one of the non-volatile memory cells;
weakly programming the non-volatile memory cells at a voltage, pulse duration or pulse count less than that of the programming;
further erasing the non-volatile memory cells in response to the weakly programming;
receiving temperature data indicative of an operating temperature of the non-volatile memory device in comparison with a temperature threshold value or range of threshold values;
one of the following:
in response to the operating temperature being below the temperature threshold value or range of threshold values, detecting an erase disturb state associated with a portion of the non-volatile memory cells in response to the further erasing and further re-erasing only the portion of the non-volatile memory cells; or
in response to the operating temperature being at or above the temperature threshold value or range of threshold values, detecting the erase disturb state associated with the portion of the non-volatile memory cells and further re-erasing all of the non-volatile memory cells; and
reading a final erase state of the non-volatile memory cells.

20. The method of claim 19, further comprising, in response to the operating temperature being at or above the temperature threshold value or range of threshold values, repeating the weakly programming and the further erasing one or more times prior to reading the final erase state of the non-volatile memory cells.

* * * * *